United States Patent
Utsunomiya et al.

(10) Patent No.: US 10,256,477 B2
(45) Date of Patent: Apr. 9, 2019

(54) GAS DIFFUSION ELECTRODE SUBSTRATE

(71) Applicant: TORAY INDUSTRIES, INC., Tokyo (JP)

(72) Inventors: Masamichi Utsunomiya, Otsu (JP); Yasuaki Tanimura, Otsu (JP); Toshiya Kamae, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 139 days.

(21) Appl. No.: 15/119,325

(22) PCT Filed: Feb. 17, 2015

(86) PCT No.: PCT/JP2015/054196
§ 371 (c)(1),
(2) Date: Aug. 16, 2016

(87) PCT Pub. No.: WO2015/125750
PCT Pub. Date: Aug. 27, 2015

(65) Prior Publication Data
US 2017/0012296 A1 Jan. 12, 2017

(30) Foreign Application Priority Data
Feb. 24, 2014 (JP) .................. 2014-032830

(51) Int. Cl.
*H01M 8/0243* (2016.01)
*H01M 8/0234* (2016.01)
*H01M 8/0239* (2016.01)
*H01M 8/1018* (2016.01)

(52) U.S. Cl.
CPC ....... *H01M 8/0243* (2013.01); *H01M 8/0234* (2013.01); *H01M 8/0239* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 6,399,236 B1 * | 6/2002 | Furuya | .................. | C25B 11/035 429/209 |
| 2004/0115499 A1 * | 6/2004 | Tani | ................ | H01M 4/8605 429/535 |
| 2005/0130023 A1 * | 6/2005 | Lebowitz | ............ | H01M 4/8605 429/480 |
| 2010/0098991 A1 * | 4/2010 | Suzuki | ................ | H01M 4/8605 429/481 |
| 2012/0276335 A1 * | 11/2012 | Hong | .................. | H01M 8/0234 428/143 |
| 2014/0127606 A1 | 5/2014 | Kuwata et al. | | |
| 2014/0134516 A1 | 5/2014 | Okuyama et al. | | |
| 2015/0118596 A1 | 4/2015 | Utsunomiya et al. | | |

FOREIGN PATENT DOCUMENTS

| | | |
|---|---|---|
| JP | 2005-285370 A | 10/2005 |
| JP | 2007-48495 A | 2/2007 |
| JP | 2009-245869 A | 10/2009 |
| JP | 2011-150893 A | 8/2011 |
| JP | 2013-20939 A | 1/2013 |
| JP | 2013-20940 A | 1/2013 |
| WO | WO 2013/172174 A1 | 11/2013 |

OTHER PUBLICATIONS

Das et al. ECS Transactions, 41 (1) 459-468 (2011) (Year: 2011).*
International Search Report for PCT/JP2015/054196 (PCT/ISA/210) dated May 19, 2015.
Written Opinion of the International Searching Authority for for PCT/JP2015/054196 (PCT/ISA/237) dated May 19, 2015.

* cited by examiner

*Primary Examiner* — Wojciech Haske
(74) *Attorney, Agent, or Firm* — Birch, Stewart, Kolasch & Birch, LLP

(57) ABSTRACT

A gas diffusion electrode substrate that is used in a fuel cell, wherein a microporous layer constituted by a carbon based filler and a fluororesin is formed on one surface of the electrode substrate, the sliding angle of water on the surface on the opposite side of the surface on which the microporous layer is formed is 30 degrees or less, and the through-plane gas permeation resistance is 15 to 190 mmAq.

16 Claims, No Drawings

GAS DIFFUSION ELECTRODE SUBSTRATE

TECHNICAL FIELD

The present invention relates to a gas diffusion electrode substrate which is suitably used for a fuel cell, particularly for a polymer electrolyte fuel cell. More specifically, the present invention relates to a gas diffusion electrode substrate which is excellent in its anti-flooding and anti-plugging characteristics and is capable of exhibiting high fuel cell performance at low temperatures, and further has excellent mechanical properties, electrical conductivity, and thermal conductivity.

BACKGROUND ART

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted by sequentially laminating a bipolar plate, a gas diffusion electrode substrate, a catalyst layer, an electrolyte membrane, a catalyst layer, a gas diffusion electrode substrate, and a bipolar plate. The gas diffusion electrode substrate is required to have high gas diffusivity for allowing a gas supplied from the bipolar plate to be diffused into the catalyst layer and high water removal performance for discharging water generated by the electrochemical reaction to the bipolar plate, as well as high electrical conductivity for extracting generated electric current, and electrode substrates composed of carbon fibers and the like are widely used.

However, the following problems are known: (1) when the polymer electrolyte fuel cell is operated at a relatively low temperature of below 70° C. in a high current density region, as a result of blockage of the electrode substrate by liquid water generated in a large amount and shortage in the fuel gas supply, the fuel cell performance is impaired (this problem is hereinafter referred to as "flooding"); and (2) when the polymer electrolyte fuel cell is operated at a relatively low temperature of below 70° C. in a high current density region, as a result of blockage of the gas flow channel (hereinafter referred to as flow channel) of the bipolar plate by liquid water generated in a large amount and shortage in the fuel gas supply, the fuel cell performance is instantaneously impaired (this problem is hereinafter referred to as "plugging"). In order to solve these problems of (1) to (2), various efforts have been made.

Patent Document 1 suggests a gas diffusion electrode substrate in which a part of a microporous layer is impregnated in the inside of the electrode substrate. According to the fuel cell using this gas diffusion electrode substrate, the gas diffusion electrode substrate surface on the bipolar plate side is smooth and has high hydrophobicity, whereby liquid water is unlikely to stay in the flow channel, and plugging is improved. However, since the porosity inside the electrode substrate is reduced, there has been a problem that gas diffusivity is decreased and the fuel cell performance is deteriorated.

Patent Document 2 suggests a gas diffusion electrode substrate using FEP as the fluororesin of the electrode substrate. According to the fuel cell using this gas diffusion electrode substrate, FEP covers the carbon fiber of the electrode substrate, thus the gas diffusion electrode substrate surface on the bipolar plate side has high hydrophobicity, liquid water is unlikely to stay in the flow channel, and plugging is improved. However, since FEP covers the carbon fiber of the electrode substrate, there has been a problem that the interface resistance between the bipolar plate and the gas diffusion electrode substrate is increased.

Patent Document 3 suggests a fuel cell using a gas diffusion electrode substrate on which a microporous layer comprising carbon black and a fluororesin is formed in both sides of the electrode substrate. According to the fuel cell using this gas diffusion electrode substrate, the microporous layer on the bipolar plate side is smooth and has high hydrophobicity, whereby liquid water is unlikely to stay in the flow channel, and plugging is improved. However, since water removal from the electrode substrate to the bipolar plate is inhibited by the microporous layer on the bipolar plate side, there has been a problem that flooding is remarkable.

As described above, a variety of efforts have been made; however, one that can be satisfied as a gas diffusion electrode substrate which is excellent in its anti-flooding and anti-plugging characteristics, and also has excellent mechanical properties, electrical conductivity and thermal conductivity is yet to be discovered.

PRIOR ART DOCUMENTS

Patent Documents

Patent Document 1: Japanese Patent Laid-open Publication No. 2008-127661
Patent Document 2: Japanese Patent Laid-open Publication No. 2006-120508
Patent Document 3: Japanese Patent Laid-open Publication No. 9-245800

SUMMARY OF THE INVENTION

Problems to be Solved by the Invention

In view of the background of the conventional art, an object of the present invention is to provide a gas diffusion electrode substrate which is excellent in its anti-flooding and anti-plugging characteristics and is capable of exhibiting high fuel cell performance at low temperatures, and further has excellent mechanical properties, electrical conductivity, and thermal conductivity.

Solutions to the Problems

In order to solve the above problems, the gas diffusion electrode substrate of the present invention adopts the following means. More specifically, the gas diffusion electrode substrate of the present invention is a gas diffusion electrode substrate that is used in a fuel cell, wherein a microporous layer constituted by a carbon based filler and a fluororesin is formed on one surface of the electrode substrate, the sliding angle of water on the surface on the opposite side of the surface on which the microporous layer is formed is 30 degrees or less, and the through-plane gas permeation resistance is 15 to 190 mmAq.

Also, in order to solve the above problems, the method for producing the gas diffusion electrode substrate of the present invention adopts the following means. More specifically, the method for producing the gas diffusion electrode substrate of the present invention is a method for producing the gas diffusion electrode substrate, comprising coating a carbon coating solution constituted by a carbon based filler, a fluororesin and a dispersion medium on one surface of an electrode substrate with a thickness of 160 μm or less, then horizontally retaining the gas diffusion electrode substrate coated with the carbon coating solution, for a period of 10 seconds or more and less than 5 minutes, and subsequently, when drying and sintering are performed, the fluororesin is not coated before coating the carbon coating solution, or sintering is not performed after coating the fluororesin.

Also, in the membrane electrode assembly of the present invention, the following means is adopted in order to solve the above problems. That is, the membrane electrode assembly of the present invention is a membrane electrode assembly having catalyst layers on both sides of the electrolyte membrane, and having the gas diffusion electrode substrate, or a gas diffusion electrode substrate obtained by the production method described above, on the further outer side of the catalyst layers.

Furthermore, in order to solve the above problems, the fuel cell of the present invention adopts the following means. That is, the fuel cell of the present invention is a fuel cell having bipolar plates on both sides of the membrane electrode assembly.

Effects of the Invention

In the gas diffusion electrode substrate of the present invention, the sliding angle of water on the surface on the opposite side of the surface on which the microporous layer of the gas diffusion electrode substrate is formed is 30 degrees or less, thus liquid water flowing in a flow channel is unlikely to be caught by the gas diffusion electrode substrate, and the anti-plugging characteristic is high. Furthermore, the gas diffusion electrode substrate of the present invention has a through-plane gas permeation resistance of 15 to 190 mmAq, thus has gas diffusivity, and when using the gas diffusion electrode substrate of the present invention, high fuel cell performance can be exhibited. Since a carbon paper or the like can be used in the electrode substrate, the gas diffusion electrode substrate of the present invention also has good mechanical strength, electrical conductivity, and thermal conductivity.

MODE FOR CARRYING OUT THE INVENTION

As an index of hydrophobicity, conventionally, the contact angle of water has been often used, and a gas diffusion electrode substrate in which a microporous layer is formed on one surface of the electrode substrate usually has a contact angle of water on the surface on the opposite side of the surface on which the microporous layer is formed of 140 degrees or more, and thus hydrophobicity difference has not been understood by the contact angle of water. However, when hydrophobicity is measured with the sliding angle of water, the difference by the kind of the gas diffusion electrode substrate can be recognized, thus the present inventors have intensively studied using the above index, and consequently achieved the present invention.

In the gas diffusion electrode substrate of the present invention, a microporous layer is formed on one surface of the electrode substrate.

In the present invention, a substrate consisting of only a carbon paper or the like without any microporous layer being formed thereon, or a portion thereof in the "gas diffusion electrode substrate" is referred to as "electrode substrate", and an electrode substrate on which a microporous layer is formed is referred to as "gas diffusion electrode substrate".

Each element will be described below.

The electrode substrate in the present invention is required to have high gas diffusivity in the in-plane direction and gas diffusivity in the through-plane direction for allowing a gas supplied from the bipolar plate to be diffused into a catalyst and high water removal performance for discharging liquid water generated by the electrochemical reaction to the bipolar plate, as well as high electrical conductivity for extracting generated electric current. The through-plane direction means a direction orthogonal to the substrate surface.

Therefore, as the electrode substrate, a carbon fiber-containing porous material such as carbon fiber woven fabric, carbon fiber non-woven fabric or carbon fiber papermaking substrate, or a metal porous material such as sinter foamed metal, metal mesh or expanded metal is preferably used. Among them, a carbon fiber-containing porous material is preferably used because of its excellent corrosion resistance, and further, a substrate on which a carbon fiber papermaking substrate is bonded with carbide, namely a "carbon paper", is preferably used because of its excellent mechanical strength. In the present invention, as described below, a substrate on which a carbon fiber papermaking substrate is bonded with carbide can be normally obtained by impregnating a carbon fiber papermaking substrate with a resin and then carbonizing the resultant.

Examples of the carbon fiber include polyacrylonitrile (PAN)-based, pitch-based and rayon-based carbon fibers. Among them, in the present invention, a PAN-based or pitch-based carbon fiber is preferably used because of its excellent mechanical strength.

In the carbon fiber of the present invention, the mean diameter of the monofilament is preferably 3 μm or more, and more preferably 5 μm or more. Also, the mean diameter of the monofilament is preferably 20 μm or less, and more preferably 10 μm or less. When the mean diameter is 3 μm or more, the pore size becomes large, and the water removal performance is improved, thus flooding can be suppressed. Meanwhile, when the mean diameter is 20 μm or less, water vapor diffusivity is reduced, and the fuel cell performance at high temperatures is improved. Also, when two or more carbon fibers having different mean diameters are used, it is preferred since surface smoothness of the electrode substrate can be improved.

Here, the mean diameter of the monofilament in the carbon fiber is an average value determined by taking a photograph of the carbon fiber at a magnification of 1000 times or more, under a microscope such as a scanning electron microscope, randomly selecting 30 different monofilaments, and measuring their diameters. As the scanning electron microscope, S-4800 manufactured by Hitachi, Ltd. or its equivalent product can be used.

In the carbon fiber of the present invention, the mean length of the monofilament is preferably 3 mm or more, and more preferably 5 mm or more. Also, the mean length of the monofilament is preferably 20 mm or less, and more preferably 15 mm or less. When the mean length is 3 mm or more, the electrode substrate attains excellent mechanical strength, electrical conductivity and thermal conductivity, which is preferred. Meanwhile, when the mean length is 20 mm or less, it is preferred since dispersibility of the carbon fiber when making a paper is excellent, and uniform electrode substrate can be obtained. A carbon fiber having the mean length can be obtained by a method of cutting a continuous carbon fiber into a desired length, or the like.

Here, the mean length of the carbon fibers is an average value determined by taking a photograph of the carbon fiber at a magnification of 50 times or more, under a microscope such as a scanning electron microscope, randomly selecting 30 different monofilaments, and measuring their length. As the scanning electron microscope, S-4800 manufactured by Hitachi, Ltd. or its equivalent product can be used. The mean diameter and mean length of the monofilament in the carbon fiber are usually measured by directly observing the carbon fiber for a carbon fiber to be a raw material, and may be measured by observing the electrode substrate.

In the present invention, the areal weight of the electrode substrate is preferably low like 50 g/m² or less, more preferably 45 g/m² or less, and further preferably 40 g/m² or less. Also, the areal weight of the electrode substrate is preferably 20 g/m² or more, more preferably 25 g/m² or more, and further preferably 30 g/m² or more. When the areal weight of the electrode substrate is 20 g/m² or more, the amount of the carbon fiber constituting the electrode substrate per unit area becomes more appropriate, electrical conductivity is further improved, electrical conductivity of the gas diffusion electrode substrate to be obtained becomes higher, and the fuel cell performance is further improved at both high temperatures and low temperatures. Also, when the areal weight of the electrode substrate is 20 g/m² or more, mechanical strength of the electrode substrate is further improved, and the electrolyte membrane and the catalyst layer are more easily supported. Meanwhile, when the areal weight of the electrode substrate is 50 g/m² or less, gas diffusivity in the through-plane direction of the electrode substrate is further improved, gas diffusivity in the through-plane direction of the gas diffusion electrode substrate to be obtained becomes larger, and the fuel cell performance is further improved at both high temperatures and low temperatures.

The electrode substrate having the above areal weight can be obtained by controlling the carbon fiber areal weight in the prepreg and the addition amount of the resin component based on the carbon fiber, in the production method described below. In the present invention, a carbon fiber-containing papermaking substrate which is impregnated with a resin composition is described as "prepreg". Here, the carbon fiber areal weight of the prepreg is reduced, thereby obtaining a low areal weight substrate, and the carbon fiber areal weight of the prepreg is increased, thereby obtaining a high areal weight substrate. Also, the addition amount of the resin component based on the carbon fiber is reduced, thereby obtaining a low areal weight substrate, and the addition amount of the resin component based on the carbon fiber is increased, thereby obtaining a high areal weight substrate. In the present invention, the areal weight means a mass per unit area.

Here, the areal weight of the electrode substrate can be obtained by dividing the mass of the electrode substrate weighed using an electronic balance by the area of XY surface of the electrode substrate. Hereinafter, the XY surface means a substrate surface. Here, it is also possible to separate the electrode substrate from the gas diffusion electrode substrate, and measure the areal weight of the electrode substrate. For example, a gas diffusion electrode substrate is heated in the atmosphere at 600° C. for 30 minutes, a resin composition contained in the microporous layer in the gas diffusion electrode substrate is oxidatively decomposed, then ultrasonic treatment is carried out in a solvent such as ethanol, whereby it is possible to remove the residue of the microporous layer and take out the electrode substrate.

In the present invention, the areal weight of the gas diffusion electrode substrate is preferably 80 g/m² or less, and more preferably 50 g/m² or less. Also, the areal weight of the gas diffusion electrode substrate is preferably 30 g/m² or more, and more preferably 35 g/m² or more. When the areal weight of the gas diffusion electrode substrate is less than 30 g/m², the amounts of the carbon fiber and carbon based filler constituting the gas diffusion electrode substrate per unit area are reduced, and the gas diffusion electrode substrate has low electrical conductivity, thus the fuel cell performance may be deteriorated at both high temperatures and low temperatures. Meanwhile, when the areal weight of the gas diffusion electrode substrate exceeds 80 g/m², gas diffusivity in the in-plane direction and gas diffusivity in the through-plane direction of the gas diffusion electrode substrate are both decreased, thus the fuel cell performance may be deteriorated at both high temperatures and low temperatures. The gas diffusion electrode substrate having the above areal weight can be obtained by controlling the areal weight of the electrode substrate and the areal weight of the microporous layer.

Here, the areal weight of the gas diffusion electrode substrate can be obtained by dividing the mass of the gas diffusion electrode substrate weighed using an electronic balance by the area of XY surface of the gas diffusion electrode substrate.

In the present invention, the size of pore inside the electrode substrate is preferably 30 μm or more, more preferably 40 μm or more, and further preferably 50 μm or more. Also, the size of pore inside the electrode substrate is preferably 80 μm or less, more preferably 75 μm or less, and further preferably 70 μm or less. When the pore size is 30 μm or more, water removal performance is further improved, and flooding can thus be further suppressed. When the pore size is 80 μm or less, higher electrical conductivity is attained, and the fuel cell performance is further improved at both high and low temperatures. In order to design the pore size in the above range, it is effective to contain both carbon fibers with a mean diameter of the monofilament of 3 μm or more and 8 μm or less, and carbon fibers with a mean diameter of the monofilament exceeding 8 μm.

Here, the size of pore inside the electrode substrate is a peak size of the pore size distribution obtained by measuring pore sizes in the range at a measurement pressure of 6 kPa to 414 MPa (pore size of 30 nm to 400 μm), by mercury intrusion technique. When a plurality of peaks appears, the peak size at the highest peak is adopted. As the measurement apparatus, AutoPore 9520 manufactured by Shimadzu Corporation or its equivalent product can be used.

In the present invention, the thickness of the electrode substrate is preferably 160 μm or less, more preferably 140 μm or less, and further preferably 120 μm or less. Also, the thickness of the electrode substrate is preferably 50 μm or more, more preferably 60 μm or more, and further preferably 70 μm or more. When the thickness of the electrode substrate is 160 μm or less, the water removal path is shortened, thus water removal performance is further improved, and flooding can be further suppressed, and also the electrical conductive path is shortened, thus electrical conductivity is further improved, and the fuel cell performance is further improved at both high temperatures and low temperatures. In addition, when the thickness of the electrode substrate is 160 μm or less, in coating the electrode substrate with a carbon coating solution, the carbon coating solution is likely to ooze out to the opposite side of the surface to be coated with the carbon coating solution, thus adhesion of the carbon based filler to the carbon fiber can be performed in the step of coating the carbon coating solution, whereby the productivity of the gas diffusion electrode substrate can be improved. Meanwhile, when the thickness of the electrode substrate is 50 μm or more, gas diffusion in the in-plane direction is increased, and gas can be supplied more easily also to a catalyst under ribs of the bipolar plate, thus the fuel cell performance is further improved at both high temperatures and low temperatures. Also, when the thickness of the electrode substrate is 50 µm or more, mechanical strength of the electrode substrate is further improved, and the electrolyte membrane and the catalyst layer are more easily supported.

The electrode substrate having the above thickness can be obtained by controlling the thickness during annealing, in the production method described below. Here, the thickness of the electrode substrate can be determined using a micrometer, in a state of being compressed at a pressure of 0.15 MPa. The individual measured values at 10 points are averaged, and the obtained value is defined as the thickness.

Here, it is also possible to separate the electrode substrate from the gas diffusion electrode substrate, and measure the thickness of the electrode substrate. For example, a gas diffusion electrode substrate is heated in the atmosphere at 600° C. for 30 minutes, a resin composition contained in the microporous layer in the gas diffusion electrode substrate is oxidatively decomposed, then ultrasonic treatment is carried out in a solvent such as ethanol, whereby it is possible to remove the residue of the microporous layer and take out the electrode substrate.

In the electrode substrate used in the present invention, as compared to the surface roughness of the side where the microporous layer of the electrode substrate is formed, the surface roughness of the opposite side thereof is preferably larger with a difference of 1.0 µm or more, more preferably 2.0 µm or more, and further preferably 2.5 µm or more. When there is a certain difference in the surface roughness between both sides of the electrode substrate, in coating the electrode substrate with a carbon coating solution, the carbon coating solution is likely to ooze out to the opposite side of the surface to be coated with the carbon coating solution, thus adhesion of the carbon based filler to the carbon fiber can be performed in the step of coating the carbon coating solution, whereby the productivity of the gas diffusion electrode substrate can be improved. Meanwhile, the difference in the surface roughness is preferably 5.0 µm or less, more preferably 4.5 µm or less, and further preferably 4.0 µm or less. The difference in the surface roughness is 5.0 µm or less, whereby mechanical strength of the electrode substrate is further improved, and the electrolyte membrane and the catalyst layer are more easily supported. Here, the surface roughness of the electrode substrate can be obtained by measuring the range of 5 mm square in the surface of the electrode substrate using a laser microscope or the like, and performing plane tilt correction, then calculating the arithmetic average roughness (Ra) [µm] on the surface.

In the present invention, the thickness of the gas diffusion electrode substrate is preferably 190 µm or less, more preferably 170 µm or less, and further preferably 150 µm or less. Also, the thickness of the gas diffusion electrode substrate is preferably 70 µm or more, more preferably 80 µm or more, and further preferably 90 µm or more. When the thickness of the gas diffusion electrode substrate is 70 µm or more, gas diffusion in the in-plane direction is further increased, and gas can be supplied more easily also to a catalyst under ribs of the bipolar plate, thus the fuel cell performance is further improved at both high temperatures and low temperatures. Meanwhile, when the thickness of the gas diffusion electrode substrate is 190 µm or less, water removal performance is further improved, and flooding can be further suppressed, and also the path for electrical conduction is more shortened, thus electrical conductivity is further improved, and the fuel cell performance is further improved at both high temperatures and low temperatures.

The gas diffusion electrode substrate having the above thickness can be obtained by controlling the thickness of the electrode substrate and the thickness of the microporous layer.

Here, the thickness of the gas diffusion electrode substrate can be determined using a micrometer, in a state of being compressed at a pressure of 0.15 MPa. The individual measured values at 10 points are averaged, and the obtained value is defined as the thickness.

In the present invention, it is necessary that a microporous layer is arranged on one surface of the electrode substrate. The microporous layer is required to have high gas diffusivity in the through-plane direction for allowing a gas supplied from the bipolar plate to be diffused into a catalyst and high water removal performance for discharging liquid water generated by the electrochemical reaction to the bipolar plate, as well as high electrical conductivity for extracting generated electric current. Furthermore, the microporous layer also has functions of promoting back-diffusion of water to an electrolyte membrane, and wetting the electrolyte membrane. In the present invention, it is important that the microporous layer is arranged only on one surface of the electrode substrate. When the microporous layer is arranged on both surfaces of the electrode substrate, the microporous layer having hydrophobicity higher than the electrode substrate is arranged between the electrode substrate and the bipolar plate, thus water removal from the inside of the electrode substrate is inhibited, and the fuel cell performance at low temperatures is deteriorated.

In the present invention, the areal weight of the microporous layer is preferably 35 $g/m^2$ or less, more preferably 30 $g/m^2$ or less, and further preferably 25 $g/m^2$ or less. Also, the areal weight of the microporous layer is preferably 10 $g/m^2$ or more, more preferably 12 $g/m^2$ or more, and further preferably 14 $g/m^2$ or more. When the areal weight of the microporous layer is 10 $g/m^2$ or more, the electrode substrate surface can be covered, back-diffusion of the generated water is further promoted, and dry-out of the electrolyte membrane can be suppressed. Also, when the areal weight of the microporous layer is 35 $g/m^2$ or less, the water removal performance is further improved, and flooding can be further suppressed.

From the viewpoint of improving electrical conductivity and water removal performance, the microporous layer is constituted by a porous material containing a carbon based filler and a fluororesin.

As the carbon based filler, carbon black, linear carbon or the like can be used. As the carbon black, it is preferred to use acetylene black with low volume resistance and high purity. As the linear carbon, it is preferred to use a linear carbon having an aspect ratio of 30 to 5000. It is preferred to use the above carbon black and linear carbon in combination. By the use of the above linear carbon, the porosity of the microporous layer is increased more than the case of using only carbon black as the carbon based filler, and gas diffusivity in the through-plane direction is improved, thus flooding can be suppressed. When carbon black and linear filler are used in combination as the carbon based filler, infiltration of the carbon coating solution into the electrode substrate is promoted upon coating the carbon coating solution, as compared to the case of using only linear carbon as the carbon based filler, adhesion of the carbon based filler to the carbon fiber is likely to occur, and the sliding angle can be reduced. The mixing mass ratio of the linear carbon to the carbon based filler is preferably 0.05 or more, more preferably 0.15 or more, and further preferably 0.2 or more. Also, the mixing mass ratio of the linear carbon to the carbon based filler is preferably 0.8 or less, more preferably 0.7 or less, and further preferably 0.65 or less.

Furthermore, the electrical conductive path of the microporous layer is shortened by using a linear carbon having an aspect ratio of 30 to 5000, and thus electrical resistance is reduced. When the aspect ratio of the linear carbon is 30 or more, entanglement of the linear carbon in the carbon coating solution increases, and the viscosity of the carbon coating solution increases. As a result, infiltration of the carbon coating solution into the electrode substrate becomes proper, thus the surface roughness of the microporous layer is reduced, and the electrical resistance of the gas diffusion electrode substrate is reduced. Meanwhile, when the aspect ratio of the linear carbon is 5000 or less, entanglement of the linear carbon in the carbon coating solution becomes proper, and aggregation and precipitation of the solid content in the carbon coating solution are unlikely to occur. In the present invention, the aspect ratio of the linear carbon is more preferably 3000 or less, and further preferably 1000 or less. Also, the aspect ratio of the linear carbon is more preferably 35 or more, and further preferably 40 or more.

Herein, the aspect ratio of the linear carbon means mean length (μm)/mean diameter (μm). The mean length is an average value determined by taking a photograph under a microscope such as a scanning electron microscope or a transmission electron microscope, at a magnification of 1000 or more, randomly selecting 10 different pieces of linear carbon, and measuring their lengths. The mean diameter is an average value determined by taking a photograph under a microscope such as a scanning electron microscope or a transmission electron microscope, at a magnification of 10000 or more, randomly selecting 10 different pieces of linear carbon, and measuring their diameters. As the scanning electron microscope, S-4800 manufactured by Hitachi, Ltd. or its equivalent product can be used.

The linear carbon includes a vapor grown carbon fiber, a single-walled carbon nanotube, a double-walled carbon nanotube, a multi-walled carbon nanotube, a carbon nanohorn, a carbon nanocoil, a cup-layered type carbon nanotube, a bamboo-like carbon nanotube, and a graphite nanofiber. Among them, a vapor grown carbon fiber, a single-walled carbon nanotube, a double-walled carbon nanotube, and a multi-walled carbon nanotube are cited as a linear carbon preferred to be used in the present invention, since the aspect ratio can be increased, and their electrical conductivity and mechanical properties are excellent. A vapor grown carbon fiber is one obtained by growing carbon in a vapor phase by a catalyst, and those having a mean diameter of 5 to 200 nm, and a mean fiber length in the range of 1 to 20 μm are preferred.

In the present invention, from the viewpoint of promoting removal of liquid water and having excellent corrosion resistance, the microporous layer contains a fluororesin. The fluororesin includes polytetrafluoroethylene (PTFE), tetrafluoroethylene-hexa fluoro propylene copolymers (FEP), tetrafluoroethylene-perfluoroalkylvinyl ether copolymers (PFA), and the like. Among them, it is preferred to use a fluororesin having a melting point of 200° C. or more and 320° C. or less. When the fluororesin as described above is used, the fluororesin becomes low in viscosity in melting, deviation of the fluororesin is reduced, and the fuel cell performance is improved. Such fluororesin includes FEP or PFA, and is particularly preferably FEP.

The content of the fluororesin is preferably 5% by mass or more, more preferably 10% by mass or more, and further preferably 15% by mass or more, in a mass ratio to the carbon based filler. Also, the content of the fluororesin is preferably 50% by mass or less, more preferably 35% by weight or less, and further preferably 30% by mass or less, in a mass ratio to the carbon based filler. The content of the fluororesin is set in the above range, whereby gas diffusivity of the microporous layer can be further improved while having sufficient hydrophobicity.

In the present invention, it is preferred that a carbon based filler is adhered to the carbon fiber surface that can be observed from the opposite side of the surface on which the microporous layer of the gas diffusion electrode substrate is formed. Further, as the carbon based filler, it is preferred to contain the linear carbon having an aspect ratio of 30 to 5000 described above. Here, whether or not the carbon based filler is adhered can be confirmed, for example, according to the following procedures. First, a photograph of the carbon fiber on the surface of the opposite side of the surface on which the microporous layer of the gas diffusion electrode substrate is formed is taken at an observation magnification of 2000 times. As the scanning electron microscope, S-4800 manufactured by Hitachi, Ltd. or its equivalent product can be used. Photographs of the images of the carbon fiber on the surface were randomly taken for 10 different points from the gas diffusion electrode substrate. Then, whether or not the carbon based filler was present on the carbon fiber of each resulting image was visually confirmed, and when the carbon based filler could be confirmed in one or more photographs, it was determined as that the carbon based filler was adhered to the carbon fiber surface.

The carbon based filler is adhered to the carbon fiber surface, whereby irregularities were formed on the carbon fiber surface, and hydrophobicity is increased. However, when the loading amount of the carbon based filler to the carbon fiber surface is much, pores of the electrode substrate are blocked, and water removal performance is deteriorated. Thus, it is preferred to control the loading amount of the carbon based filler to the extent of having a pore with a diameter of 10 μm or more on the electrode substrate surface on the opposite side of the surface on which the microporous layer of the gas diffusion electrode substrate is formed. Also, the diameter of the pore on the electrode substrate surface is preferably 20 μm or more, and further preferably 30 μm or more.

Here, the size of the pore on the electrode substrate surface of the opposite side of the surface on which the microporous layer in the gas diffusion electrode substrate is formed is measured by a scanning electron microscope. Ten points are randomly selected from the electrode substrate surface of the opposite side of the surface on which the microporous layer in the gas diffusion electrode substrate is formed, and photographs are taken at an observation magnification of 400 times, then the diameter of the pore in each image is measured. For the pore that is not circular, the diameter of the inscribed circle is defined as a pore diameter. As the scanning electron microscope, S-4800 manufactured by Hitachi, Ltd. or its equivalent product can be used. When a plurality of pores is present in the obtained image, a pore with the largest diameter is used. The average of the values obtained in each diameter is defined as a pore diameter.

As the index of the loading amount of the carbon based filler to the carbon fiber surface, the covering rate of the carbon based filler on the carbon fiber surface can be used. Namely, it is preferred that the above covering rate that can be observed from the opposite side of the surface on which the microporous layer of the gas diffusion electrode substrate is formed is within the range of 1 to 70%. The above covering rate is more preferably 50% or less, and further preferably 30% or less. Also, the above covering rate is more preferably 6% or more, and further preferably 8% or more. When the covering rate is 1% or more, irregularities are formed on the carbon fiber surface, and hydrophobicity is increased. In addition, when the covering is 70% or less, pores of the electrode substrate are unlikely to be blocked, thus a gas diffusion electrode substrate having high gas diffusivity in the through-plane direction and high fuel cell performance is formed.

Here, the covering rate of the carbon based filler on the carbon fiber surface can be obtained, for example, according to the following procedures. First, a photograph of the carbon fiber on the surface of the opposite side of the surface on which the microporous layer of the gas diffusion electrode substrate is formed is taken at an observation magnification of 2000 times. As the scanning electron microscope, S-4800 manufactured by Hitachi, Ltd. or its equivalent product can be used. Different points are randomly selected from the gas diffusion electrode substrate until 10 images of the carbon fiber on the surface are obtained, and photographs are taken. Next, carbon fiber parts are cut out from the obtained images, and binarization is performed. A variety of binarization methods are available and, in cases where the portion covered with the carbon based filler can be clearly distinguished from the portion not covered with the carbon based filler, a method of visually distinguishing these portions may be employed; however, in the present invention, it is preferred to employ a method which utilizes an image processing software or the like. Here, as the image processing software, Adobe "PHOTOSHOP" (registered trademark) manufactured by Adobe System Inc. or JTrim can be used. Next, a processing method in the case of using JTrim v1.53c will be described. It is preferred that normalization processing is performed in each image, then bi-level thresholding is performed at a threshold of 128 to obtain a binarized image. In each of the obtained binarized images, the area ratio (%) of the portion covered with the carbon based filler to the area of the carbon fiber (sum of the area of the portion covered with the carbon based filler and the area of the portion not covered with the carbon based filler) is calculated, and the average value thereof is obtained and defined as the covering rate described above. When binarization is performed by the image processing software, in the case where the side portion of the carbon fiber is white due to the shape effect of the carbon fiber, it is preferred to remove 0.5 µm of the carbon fiber side when cutting out the carbon fiber part. When the area ratio is obtained by the image processing software, it is preferred to count the pixel number and calculate the area ratio.

In the present invention, it is preferred that a fluororesin is present on the carbon fiber surface that is observed from the opposite side of the surface on which the microporous layer of the gas diffusion electrode substrate is formed and the carbon based filler surface. The presence of fluororesin can be confirmed depending on whether or not fluorine is detected. A fluororesin is present on the carbon fiber surface that is observed from the opposite side of the surface on which the microporous layer of the gas diffusion electrode substrate is formed and the carbon based filler surface, whereby the surface on the opposite side of the surface on which the microporous layer is formed shows strong hydrophobicity with a sliding angle of 30 degrees or less. Here, using a scanning electron microscopy (SEM)-EDX measurement for the detection of fluorine, a measurement is performed in the conditions of an acceleration voltage of 10 kV and a magnification of 400 times or more. In the spectrum data obtained in the measurement, the case where the peak is observed at 0.68 to 0.69 keV is defined that fluorine is detected. As the scanning electron microscope, S-4800 manufactured by Hitachi, Ltd. or its equivalent product can be used. As the energy dispersive X-ray analyzer, EX-220SE manufactured by HORIBA, Ltd. or its equivalent product can be used.

In the present invention, the porosity of the microporous layer is preferably 60% or more, more preferably 65% or more, and further preferably 70% or more. Also, the porosity of the microporous layer is preferably 85% or less, more preferably 80% or less, and further preferably 75% or less. When the porosity is 60% or more, water removal performance is further improved, and flooding can thus be further suppressed. When the porosity is 85% or less, water vapor diffusivity is smaller, and dry-out can be further suppressed. In addition, high electrical conductivity is attained, and the fuel cell performance is thus improved at both high and low temperatures.

The microporous layer having the above porosity is obtained by controlling the areal weight of the microporous layer, the addition amount of the carbon based filler based on other materials including the fluororesin, the type of the carbon based filler, and the thickness of the microporous layer, in the production method described below. Among them, it is effective to control the addition amount of the carbon based filler based on other materials including the fluororesin, and the type of the carbon based filler. Here, a microporous layer with a high porosity is obtained by increasing the addition amount of the carbon based filler based on other materials including the fluororesin, and a microporous layer with a low porosity is obtained by decreasing the addition amount of the carbon based filler based on other materials including the fluororesin.

Here, the porosity of the microporous layer is determined by using a sample for cross-section observation prepared by use of an ion beam cross-section processing apparatus, taking a photograph of a cross-section under a microscope such as a scanning electron microscope at a magnification of 1000 times or more, measuring an area of the pore part, and then calculating an area ratio of the pore part to the observed area. As the scanning electron microscope, S-4800 manufactured by Hitachi, Ltd. or its equivalent product can be used.

In the present invention, it is necessary that a microporous layer is arranged on one surface of the electrode substrate, and, it is preferred that a part of the microporous layer is infiltrated into the electrode substrate, from the viewpoint that it is possible to reduce the sliding angle of the gas diffusion electrode substrate and reduce the electrical resistance between the bipolar plate and the gas diffusion electrode substrate.

In the present invention, the sliding angle of water on the surface on the opposite side of the surface on which the microporous layer of the gas diffusion electrode substrate is formed is used as the index of anti-plugging characteristic. The smaller the sliding angle, the higher the anti-plugging characteristic. The sliding angle is necessarily 30 degrees or less, more preferably 25 degrees or less, and further preferably 20 degrees or less. When the sliding angle is 30 degrees or less, it can be suppressed that liquid water flowing in a flow channel during power generation of the fuel cell adheres to the gas diffusion electrode substrate, and it becomes possible to rapidly remove liquid water in the flow channel, thus the anti-plugging characteristic is improved. The sliding angle refers to, when setting the gas diffusion electrode substrate horizontal, with the opposite side of the surface on which the microporous layer of the gas diffusion electrode substrate is formed facing upward, putting 10 μL of purified water the above surface, and tilting the surface at a rate of 1 degree/sec, an angle at which the purified water starts to roll. The sliding angle can be measured using automated contact angle meter DM-501 manufactured by Kyowa Interface Science Co., Ltd. or its equivalent product can be used.

The gas diffusion electrode substrate having the above sliding angle is obtained by controlling the mixing mass ratio of the linear carbon to the carbon based filler, the type and addition amount of the fluororesin, the covering rate of the carbon based filler on the carbon fiber surface, the horizontal retention time after coating the carbon coating solution until drying it, and the like, in the production method described below. Among them, it is effective to control the addition amount of the fluororesin and the covering rate of the carbon based filler on the carbon fiber surface. Here, it is possible to reduce the sliding angle by increasing the addition amount of the fluororesin and the covering rate of the carbon based filler on the carbon fiber surface.

In the present invention, the through-plane gas permeation resistance is used as the index of gas diffusivity in the through-plane direction. The smaller the through-plane gas permeation resistance of the gas diffusion electrode substrate, the higher the gas diffusivity in the through-plane direction. It is necessary that the through-plane gas permeation resistance is within the range of 15 to 190 mmAq. The through-plane gas permeation resistance is more preferably 180 mmAq or less, and further preferably 170 mmAq or less. Also, the through-plane gas permeation resistance is more preferably 25 mmAq or more, and further preferably 50 mmAq or more. When the through-plane gas permeation resistance is more preferably 15 mmAq or more, water vapor diffusivity can be made smaller, and drying of the electrolyte membrane can be further suppressed. Also, when the through-plane gas permeation resistance is 190 mmAq or less, the gas diffusivity in the through-plane direction is further improved, and high fuel cell performance across a wide temperature range from low to high temperatures is more likely to be exhibited. Here, the through-plane gas permeation resistance of the gas diffusion electrode substrate can be measured as follows. More specifically, using a circular sample with a diameter of 4.7 cm cut out from the gas diffusion electrode substrate, the pressure difference between the surface of the microporous layer and the opposite surface thereof when an air is permeated from the surface on the microporous layer side to the opposite surface thereof at a flow rate of 58 cc/min/cm$^2$ is measured by a differential pressure meter, and the measured value is defined as the through-plane gas permeation resistance. When the through-plane gas permeation resistance of the gas diffusion electrode substrate is not obtained due to the reason that the gas diffusion electrode substrate alone is not available, or the like, the gas diffusion electrode substrate is taken out from the membrane electrode assembly, and the through-plane gas permeation resistance of the gas diffusion electrode substrate can be obtained by the method described above.

The gas diffusion electrode substrate having the above through-plane gas permeation resistance is obtained by controlling the areal weights of the electrode substrate and the gas diffusion electrode substrate, the porosities of the electrode substrate and the gas diffusion electrode substrate, infiltration of the carbon coating solution, and the like. Here, the through-plane gas permeation resistance can be decreased by decreasing the areal weights of the electrode substrate and the gas diffusion electrode substrate, and/or increasing the porosities of the electrode substrate and the gas diffusion electrode substrate.

In the present invention, the electrical resistance in the through-plane direction in a state where the gas diffusion electrode substrate is pressurized at 1 MPa is preferably 7.4 mΩ·cm$^2$ or less, more preferably 7 mΩ·cm$^2$ or less, and further preferably 6.5 mΩ·cm$^2$ or less. When the electrical resistance is 7.4 mΩ·cm$^2$ or less, the resistance overvoltage of the fuel cell can be reduced, and the fuel cell performance of the fuel cell stack is improved. In order to reduce the electrical resistance, it can be adjusted by increasing the covering rate of the carbon based filler on the carbon fiber surface, or reducing the addition amount of the fluororesin. Also, the lower limit of the electrical resistance in the through-plane direction in a state where the gas diffusion electrode substrate is pressurized at 1 MPa is not particularly limited. However, when the covering rate of the carbon based filler on the carbon fiber surface is increased too much for reducing the electrical resistance, the through-plane gas diffusion resistance is increased, and the addition amount of the fluororesin is reduced too much, the sliding angle is increased, thus the electrical resistance is preferred to reduced up to around 2 mΩ·cm$^2$.

Next, a method suitable for obtaining the gas diffusion electrode substrate of the present invention will be concretely described, with reference to an example of the baked carbon fiber obtained from a carbon fiber papermaking substrate, as the electrode substrate.

<Papermaking Substrate and Production Method of Papermaking Substrate>

In order to obtain a carbon fiber-containing papermaking substrate, a wet papermaking method in which a carbon fiber-containing paper sheet is produced by dispersing carbon fibers in a liquid, a dry papermaking method in which a carbon fiber-containing paper sheet is produced by dispersing carbon fibers in the air or the like is employed. Among them, a wet papermaking method is preferably employed because of its excellent productivity.

For the purpose of improving the water removal performance and gas diffusivity in the in-plane direction of the electrode substrate, carbon fibers can be mixed with an organic fiber to make a paper. As the organic fiber, a polyethylene fiber, a vinylon fiber, a polyacetal fiber, a polyester fiber, a polyamide fiber, a rayon fiber, an acetate fiber or the like can be used.

Further, for the purpose of improving the shape-retaining property and ease of handling of the papermaking substrate, an organic polymer can be incorporated as a binder. Here, as the organic polymer, polyvinyl alcohol, polyvinyl acetate, polyacrylonitrile, cellulose or the like can be used.

In order to maintain the in-plane electrical conductivity and thermal conductivity to be isotropic, the papermaking substrate is preferably in the form of a sheet in which carbon fibers are randomly dispersed in a two-dimensional plane.

Although the pore size distribution obtained for the papermaking substrate is influenced by the content rate and dispersion state of the carbon fibers, the pores can be formed at a size of about 20 to 500 μm.

In the papermaking substrate, the areal weight of the carbon fiber is preferably 10 g/m$^2$ or more, more preferably 15 g/m$^2$ or more, and further preferably 20 g/m$^2$ or more. Also, in the papermaking substrate, the areal weight of the carbon fiber is preferably 40 g/m$^2$ or less, more preferably 35 g/m$^2$ or less, and further preferably 30 g/m$^2$ or less. When the carbon fiber areal weight is 10 g/m$^2$ or more, the electrode substrate has excellent mechanical strength, which is preferred. When the carbon fiber areal weight is 40 g/m² or less, the electrode substrate has excellent gas diffusivity in the in-plane direction and water removal performance, which is preferred. In cases where a plurality of papermaking substrates are laminated, it is preferred that the post-lamination carbon fiber areal weight be in the above-described range.

Here, the carbon fiber areal weight in the papermaking substrate can be determined by retaining a papermaking substrate cut into a 10-cm square under a nitrogen atmosphere in an electric furnace at a temperature of 450° C. for 15 minutes and then dividing the mass of the residue obtained by removal of organic matters by the area of the papermaking substrate (0.01 m²).

<Impregnation of Resin Composition>

A resin composition is impregnated in a carbon fiber-containing papermaking substrate to form a prepreg. As a method for impregnating a carbon fiber-containing papermaking substrate with a resin composition, a method of dipping a papermaking substrate into a resin composition-containing solution, a method of coating a papermaking substrate with a resin composition-containing solution, a method of laminating and transferring a film composed of a resin composition onto a papermaking substrate, or the like can be employed. Among them, a method of dipping a papermaking substrate into a resin composition-containing solution is preferably employed because of its excellent productivity.

The resin composition used in the present invention is preferably one carbonized on baking to yield an electrically conductive carbide. The resin composition refers to a resin component to which a solvent or the like is added as required. Here, the term "resin component" refers to a component which contains a resin such as a thermosetting resin and, as required, an additive(s) such as a carbon based filler and a surfactant.

More specifically, it is preferred that the carbonization yield of the resin component contained in the resin composition be 40% by mass or more. When the carbonization yield is 40% by mass or more, the electrode substrate attains excellent mechanical properties, electrical conductivity and thermal conductivity, which is preferred.

The resin constituting the resin component includes thermosetting resins such as phenolic resins, epoxy resins, melamine resins and furan resin, and the like. Among them, a phenolic resin is preferably used because of its high carbonization yield. Further, as an additive to be added to the resin component as required, a carbon based filler can be added for the purpose of improving the mechanical properties, electrical conductivity and thermal conductivity of the electrode substrate. Here, as the carbon based filler, a carbon black, a carbon nanotube, a carbon nanofiber, a milled carbon fiber, graphite or flaky graphite can be used.

The resin composition used in the present invention can use a resin component obtained by the above-described constitution as it is, and the resin composition may also contain, as required, a variety of solvents for the purpose of improving impregnation property into a papermaking substrate. Here, as the solvent, methanol, ethanol, isopropyl alcohol or the like can be used.

It is preferred that the resin composition used in the present invention be in a liquid form under a condition of 25° C. and 0.1 MPa. When the resin composition is in a liquid form, it has excellent impregnation property into a papermaking substrate, so that the electrode substrate attains excellent mechanical properties, electrical conductivity and thermal conductivity, which is preferred.

The resin component is impregnated in an amount of preferably 30 to 400 parts by mass, and more preferably 50 to 300 parts by mass, with respect to 100 parts by mass of the carbon fibers. When the amount of the impregnated resin component is 30 parts by mass or more, the electrode substrate has excellent mechanical properties, electrical conductivity and thermal conductivity, which is preferred. Meanwhile, when the amount of the impregnated resin component is 400 parts by mass or less, the electrode substrate has excellent gas diffusivity in the in-plane direction and gas diffusivity in the through-plane direction, which is preferred.

<Lamination and Annealing>

A prepreg in which a carbon fiber-containing papermaking substrate is impregnated with a resin composition is formed, and then the obtained prepreg can be laminated and/or annealed prior to carbonization.

In order to allow the electrode substrate to have a prescribed thickness, a plurality of such prepregs can be laminated. In this case, a plurality of prepregs having the same properties can be laminated, or a plurality of prepregs having different properties can be laminated. Specifically, it is possible to laminate a plurality of prepregs that are different in terms of the mean diameter and mean length of the carbon fibers, the carbon fiber areal weight of the papermaking substrate, the amount of the impregnated resin component, or the like.

In order to increase viscosity of the resin composition or partially cross-link the resin composition, the prepreg can be subjected to annealing. As an annealing method, a method of blowing hot air against the prepreg, a method of heating the prepreg by sandwiching it between hot platens of a press apparatus, a method of heating the prepreg by sandwiching it between continuous belts or the like can be employed.

<Carbonization>

After impregnating the carbon fiber-containing papermaking substrate with the resin composition, the resulting papermaking substrate is baked in an inert atmosphere to perform carbonization. For this baking, a batch-type heating furnace or a continuous heating furnace can be used. Further, the inert atmosphere can be obtained by allowing an inert gas such as nitrogen gas or argon gas to flow in the furnace.

In the present invention, the highest temperature in the baking is preferably within the range of 1300 to 3000° C., more preferably within the range of 1700 to 3000° C., and further preferably within the range of 1900 to 3000° C. When the highest temperature is 1300° C. or more, carbonization of the resin component is facilitated, so that the electrode substrate attains excellent electrical conductivity and thermal conductivity, which is preferred. Meanwhile, when the highest temperature is 3000° C. or less, the operating cost of the heating furnace is reduced, which is also preferred.

It is preferred that the temperature rising rate in the baking be within the range of 80 to 5000° C./min. When the temperature rising rate is 80° C./min or more, excellent productivity is preferably attained. Meanwhile, when the temperature rising rate is 5000° C./rain or less, carbonization of the resin component slowly proceeds and a dense structure is formed, thus the electrode substrate attains excellent electrical conductivity and thermal conductivity, which is preferred.

In the present invention, a carbon fiber-containing papermaking substrate which is impregnated with a resin composition and then carbonized is referred to as "baked carbon fiber".

<Hydrophobic Treatment>

As described below, when adhering the carbon based filler to the carbon fiber surface that can be observed from the opposite side of the surface on which the macroporous layer of the gas diffusion electrode substrate is formed, in the case where the electrode substrate is dipped in an impregnation liquid containing a carbon based filler and a fluororesin, before coating the carbon coating solution, a baked carbon fiber may be subjected to a hydrophobic treatment, for the purpose of improving water removal performance. Meanwhile, as described below, when adhering the carbon based filler to the carbon fiber surface that can be observed from the opposite side of the surface on which the microporous layer of the gas diffusion electrode substrate is formed, in the case where it is performed by infiltrating a part of the carbon coating solution in the electrode substrate, by coating the carbon coating solution, it is preferred that a hydrophobic treatment is not performed before coating the electrode substrate with the carbon coating solution.

The hydrophobic treatment can be performed by coating a fluororesin on the baked carbon fiber and subsequently annealing the coated baked carbon fiber. Herein, the fluororesin includes polytetrafluoroethylene (PTFE), tetrafluoroethylene-hexa fluoro propylene copolymers (FEP), tetrafluoroethylene-perfluoroalkylvinyl ether copolymers (PFA), and the like. The amount of the coated fluororesin is preferably 1 to 50 parts by mass, and more preferably 3 to 40 parts by mass, with respect to 100 parts by mass of the baked carbon fiber. When the amount of the coated fluororesin is 1 part by mass or more, the electrode substrate has excellent water removal performance, which is preferred. Meanwhile, when the amount of the coated fluororesin is 50 parts by mass or less, the electrode substrate has excellent electrical conductivity, which is preferred. After coating the fluororesin, it is preferred to dry it at a temperature of 90° C. or more and less than 200° C., but sintering should not be performed before coating the carbon coating solution. Specifically, annealing at 200° C. or more should be avoided. When annealing is performed at a temperature of 200° C. or more on the electrode substrate coated with fluororesin, the surfactant adhered around the fluororesin is pyrolyzed, and the electrode substrate becomes hydrophobic. Drying after coating the fluororesin is performed at 90° C. or more and less than 200° C., whereby infiltration of the carbon coating solution into the electrode substrate is promoted, and the time required for adhesion of the carbon based filler to the carbon fiber is shortened.

The baked carbon fiber corresponds to the "electrode substrate". As described above, the baked carbon fiber is subjected to a hydrophobic treatment as necessary, but in the present invention, it is defined that the baked carbon fiber subjected to a hydrophobic treatment also corresponds to the "electrode substrate" (the baked carbon fiber not subjected to a hydrophobic treatment naturally corresponds to the "electrode substrate").

<Formation of Microporous Layer>

The microporous layer can be formed by coating a carbon coating solution constituted by a carbon based filler, a fluororesin and a dispersion medium, on one surface of the electrode substrate. Here, the thickness of the electrode substrate at this time is preferably 160 μm or less.

The carbon coating solution may contain a dispersant such as a surfactant. As the dispersion medium, water, organic solvents and the like are used, but when an alcohol such as ethylene glycol is used as the dispersion medium, infiltration of the carbon coating solution into the electrode substrate is too fast to control, thus water is preferably used as the dispersion medium. It is more preferred to use a nonionic surfactant as the dispersant. Also, as the carbon based filler, the linear carbon having a specific aspect ratio as described above is preferably used, but other various carbon based fillers may be contained.

The coating of the carbon coating solution onto the electrode substrate can be carried out using a variety of commercially available coating apparatuses. As a coating system, screen printing, rotary screen printing, spraying, intaglio printing, gravure printing, die coating, bar coating, blade coating or the like can be employed. The coating methods exemplified above are presented for the illustration purpose only, and the coating method is not necessarily restricted thereto.

In order to adhere the carbon based filler to the carbon fiber surface that can be observed from the opposite side of the surface on which the microporous layer of the gas diffusion electrode substrate is formed, it may be performed by infiltrating a part of the carbon coating solution in the electrode substrate, by coating the carbon coating solution, and it may be adhered by dipping the electrode substrate in an impregnation liquid containing a carbon based filler and a fluororesin and drying it, before coating the carbon coating solution. For improving the productivity of the gas diffusion electrode substrate, it is preferred to be performed by infiltrating a part of the carbon coating solution in the electrode substrate, by coating the carbon coating solution.

When adhering the carbon based filler to the carbon fiber surface that can be observed from the opposite side of the surface on which the microporous layer of the gas diffusion electrode substrate is formed, in the case where it is performed by infiltrating a part of the carbon coating solution in the electrode substrate, by coating the carbon coating solution, it is preferred that a hydrophobic treatment is not performed (fluororesin is not coated) before coating the electrode substrate with the carbon coating solution. Infiltration of the carbon coating solution into the electrode substrate is promoted by not performing a hydrophobic treatment, and the time required for adhesion of the carbon based filler to the carbon fiber is shortened. Furthermore, since a hydrophobic treatment step can be reduced, the productivity of the gas diffusion electrode substrate is improved.

After coating the electrode substrate with the carbon coating solution, it is preferred to horizontally retain the gas diffusion electrode substrate coated with the carbon coating solution, for a period of 10 seconds or more and less than 5 minutes, until drying it. More specifically, the gas diffusion electrode substrate is retained such that the XY surface is horizontal. Here, the term "horizontal" means that a plane can keep horizontal to an extent that the carbon coating solution in the substrate does not move in the plane. The gas diffusion electrode substrate is horizontally retained for 10 seconds or more, whereby the carbon coating solution is infiltrated into the electrode substrate, and the carbon based filler is adhered to the carbon fiber surface. The retention time is less than 5 minutes, whereby the productivity of the gas diffusion electrode substrate is improved. Here, the viscosity of the carbon coating solution is preferably within the range of 1 to 25 Pa·s, more preferably within the range of 2 to 20 Pa·s, and further preferably within the range of 3 to 15 Pa·s. The viscosity is measured by a shear rate and shear stress control type viscometer. By a temperature-adjusted viscometer so that the carbon coating solution is adjusted to 23° C., the viscosity at a shear rate of 17 $s^{-1}$ is measured using a cone with a cone angle of 1 degree. As the shear rate and shear stress control type viscometer, shear rate and shear stress control type viscometer RC30 manufacture by VISCOTECH CO., LTD., or its equivalent product can be used.

After the coating of the carbon coating solution onto the electrode substrate, it is preferred to dry the coating liquid at a temperature of 80 to 150° C. for removing the dispersion medium. That is, the coated matter is placed in a dryer whose temperature is set at 80 to 150° C. and dried in the range of 5 to 30 minutes. The drying air volume may be properly decided, but rapid drying is not desirable since micro cracks may be induced in the surface of the microporous layer. As described above, solid contents in the carbon coating solution (carbon based filler, fluororesin, surfactant, etc.) are remained after drying.

The dried coated matter is placed in a muffle furnace, a baking furnace or a high-temperature drying furnace and heated at 300 to 380° C. for 5 to 20 minutes to melt the fluororesin, and sintering is performed with the melted fluororesin as a binder of the carbon based fillers. The surfactant is pyrolyzed by performing sintering, and a microporous layer that is a porous material containing a carbon based filler and a fluororesin is formed.

Either in the coating step of the carbon coating solution or hydrophobic treatment step, in the case of using tetrafluoroethylene-hexa fluoro propylene copolymers (FEP) as the fluororesin, the temperature of a muffle furnace, a baking furnace or a high-temperature drying furnace is preferably at 370° C. or less. The temperature is set at 370° C. or less, whereby the pyrolysis of tetrafluoroethylene-hexa fluoro propylene copolymers (FEP) can be suppressed.

<Membrane Electrode Assembly>

A membrane electrode assembly can be constituted by binding the above-described gas diffusion electrode substrate on at least one surface of a solid polymer electrolyte membrane having a catalyst layer on both surfaces. At this time, when the microporous layer is arranged on the catalyst layer side, back-diffusion of the generated water is more likely to occur, and also the contact area between the catalyst layer and the gas diffusion electrode substrate is increased, so that the contact electrical resistance can be reduced.

<Fuel Cell>

The fuel cell of the present invention is a fuel cell having bipolar plates on both sides of the membrane electrode assembly described above. That is, the fuel cell is constituted by having bipolar plates on both sides of the membrane electrode assembly described above. Usually, a polymer electrolyte fuel cell is constituted by laminating a plurality of the above membrane electrode assemblies that are sandwiched by bipolar plates from both sides via a gasket. The catalyst layer is composed of a layer containing a solid polymer electrolyte and a carbon material of carbon-supported catalyst. As the catalyst, platinum is usually used. In a fuel cell in which a carbon monoxide-containing reformed gas is supplied to the anode side, it is preferred to use platinum and ruthenium as catalysts of the anode side. As the solid polymer electrolyte, it is preferred to use a perfluorosulfonic acid-based polymer material having high protonic conductivity, oxidation resistance, and heat resistance. The constitutions themselves of the above fuel cell unit and fuel cell are well known. Here, it is preferred that, in the fuel cell of the present invention, the microporous layer of the gas diffusion electrode substrate is in contact with the catalyst layer.

EXAMPLES

Hereinbelow, the present invention will be concretely described by way of examples. The materials, and the methods for producing an electrode substrate and a gas diffusion electrode substrate, and the battery performance evaluation method of fuel cell that are used in the examples are described below.

<Preparation of Electrode Substrate>

Polyacrylonitrile based carbon fibers "TORAYCA" (registered trademark) T300 (average carbon fiber diameter: 7 μm) manufactured by Toray Industries, Inc. were cut at a mean length of 12 mm and dispersed in water to continuously make a paper by a wet papermaking method. Further, a 10% by mass aqueous solution of polyvinyl alcohol as a binder was coated on the paper and then dried to prepare a papermaking substrate having a carbon fiber areal weight of 15.5 g/m$^2$. The amount of the coated polyvinyl alcohol was 22 parts by mass with respect to 100 parts by mass of the papermaking substrate.

Using a resin obtained by mixing a resol type phenolic resin and a novolak type phenolic resin at a 1:1 mass ratio as a thermosetting resin, a flake graphite (mean particle size 5 μm) as a carbon based filler and methanol as a solvent, the materials were mixed at a ratio of thermosetting resin/carbon based filler/solvent=10 parts by mass/5 parts by mass/85 parts by mass, and the resulting mixture was stirred for 1 minute using an ultrasonic dispersion apparatus to obtain a uniformly dispersed resin composition.

The papermaking substrate was cut into a size of 15 cm×12.5 cm and dipped into the resin composition filled in an aluminum tray, thereby impregnating 130 parts by mass of the resin component (thermosetting resin+carbon based filler) with respect to 100 parts by mass of the carbon fibers, then the papermaking substrate was dried by heating at 100° C. for 5 minutes to prepare a prepreg. Next, the prepreg was annealed at 180° C. for 5 minutes while being pressurized by a pressing machine with flat plates. Here, when pressing the prepreg, the space between the upper and lower press plates was adjusted by arranging a spacer in the pressing machine with flat plate such that the annealed prepreg had a thickness of 130 μm.

A substrate with the annealed prepreg was introduced into a heating furnace having the highest temperature of 2400° C., in which a nitrogen gas atmosphere was maintained, to obtain a baked carbon fiber.

5 parts by mass of PTFE was imparted to 95 parts by mass of the baked carbon fiber, and the resultant was dried by heating at 100° C. for 5 minutes to prepare an electrode substrate with a thickness of 100 μm, an areal weight of 24 g/m$^2$, and a size of the pore inside the electrode substrate of 35 μm.

<Formation of Microporous Layer>

The microporous layer was formed on the electrode substrate using a slit die coater. The carbon coating solutions herein used were adjusted to have the composition of the carbon coating solutions shown in Tables 1 to 5 in which the addition amounts are shown in parts by mass, using at least one of acetylene black that is a kind of carbon black ("DENKA BLACK" (registered trademark) manufactured by Denka Company Limited), vapor growth carbon fibers ("VGCF" (registered trademark) manufactured by SHOWA DENKO K.K., mean diameter: 0.15 μm, mean fiber length: 8 μm, aspect ratio: 50, a kind of linear carbon), vapor growth carbon fibers ("VGCF-S" (registered trademark) manufactured by SHOWA DENKO K.K., mean diameter: 0.10 μm, mean fiber length: 11 μm, aspect ratio: 110, a kind of linear carbon) and multi-walled carbon nanotube (manufactured by Cheap Tubes Inc., mean diameter: 0.015 μm, mean fiber length: 20 μm, aspect ratio: 1300, a kind of linear carbon) as the carbon based filler, using PTFE ("POLYFLON" (registered trademark) D-1E manufactured by Daikin Industries, Ltd.) or FEP ("NEOFLON" (registered trademark) ND-110 manufactured by Daikin Industries, Ltd.) as the fluororesin, using "TRITON" (registered trademark) X-100 manufactured by Nacalai Tesque, Inc. as the surfactant, and using purified water or ethylene glycol (manufactured by Nacalai Tesque, Inc.) as the dispersion medium. Here, the addition amounts of PTFE and FEP shown in Tables 1 to 5 represent the addition amounts of PTFE and FEP as the water dispersion liquid. After coating the electrode substrate with the carbon coating solution using a die coater, the electrode substrate was horizontally retained for 60 seconds, then heated (sintered) at 120° C. for 10 minutes and at 380° C. for 10 minutes to prepare a gas diffusion electrode substrate in which the carbon based filler is adhered to the carbon fiber surface of the gas diffusion electrode substrate.

<Evaluation of Fuel Cell Performance of Polymer Electrolyte Fuel Cell>

A catalyst paste was prepared by sequentially adding 1.00 g of a carbon material of carbon-supported platinum catalyst (manufactured by Tanaka Kikinzoku Kogyo K.K., platinum supporting amount: 50% by mass), 1.00 g of purified water, 8.00 g of "NAFION" (registered trademark) solution (manufactured by Aldrich, "NAFION" (registered trademark), 5.0% by mass) and 18.00 g of isopropyl alcohol (manufactured by Nacalai Tesque, Inc.).

Then, a "NAFLON" (registered trademark) PTFE tape "TOMBO" (registered trademark) No. 9001 (manufactured by NICHIAS Corporation) which was cut into a size of 7 cm×7 cm was coated with the obtained catalyst paste using a spray and dried at room temperature to prepare a PTFE sheet equipped with a catalyst layer having a platinum amount of 0.3 mg/cm$^2$. Subsequently, a solid polymer electrolyte membrane, "NAFION" (registered trademark) NRE-211CS (manufactured by DuPont) which was cut into a size of 10 cm×10 cm was sandwiched with two catalyst layer-equipped PTFE sheets. The resultant was pressed at 130° C. for 5 minutes while pressurizing at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 7 cm×7 cm, and the resultant was pressed at 130° C. for 5 minutes while pressurizing at 3 MPa using a pressing machine with flat plates, thereby preparing a membrane electrode assembly. It is noted here that the gas diffusion electrode substrate was arranged such that the surface having the microporous layer was in contact with the catalyst layer.

The obtained membrane electrode assembly was incorporated into a fuel cell evaluation unit cell to measure the voltage when the current density was changed. Here, as a bipolar plate, a serpentine-type bipolar plate having one flow channel of 1.0 mm in channel width, 1.0 mm in channel depth and 1.0 mm in rib width was used. Further, the evaluation was carried out with non-pressurized hydrogen and non-pressurized air being supplied to the anode side and the cathode side, respectively. The hydrogen and air were both humidified using a humidification pot whose temperature was set at 80° C. Also, the utilization ratios of the hydrogen and atmospheric oxygen were set at 80% and 67%, respectively.

First, the output voltage when setting at an operation temperature of 65° C., a humidification temperature of 80° C., and a current density of 2.2 A/cm$^2$ was measured, and the measured value was used as an index of the anti-flooding characteristic (low-temperature performance). Also, the output voltage drop frequency when setting at an operation temperature of 65° C. and a current density of 2.2 A/cm$^2$ and retained for 30 minutes was counted, and the count was used as an index of the anti-plugging characteristic. More specifically, the frequency at which the output voltage is 0.20 V or less in 30 minutes was counted, and the count of seven times or more, five to six times, three to four times, and two times or less were evaluated as C, B, A, and S, respectively.

<Measurement of Sliding Angle>

The sliding angle refers to, when setting the gas diffusion electrode substrate horizontal, with the opposite side of the surface on which the microporous layer of the gas diffusion electrode substrate is formed facing upward, putting 10 μL of purified water the above surface, and tilting the surface at a rate of 1 degree/sec, an angle at which the purified water starts to roll. The sliding angle was measured using automated contact angle meter DM-501 manufactured by Kyowa Interface Science Co., Ltd. The measurements were performed 8 times changing the position, and the average thereof was used.

<Measurement of Electrical Resistance>

The electrical resistance in the through-plane direction of the gas diffusion electrode substrate was obtained by flowing a current of 1.0 A when the gas diffusion electrode substrate cut into 2.23 mm×2.23 mm was sandwiched between two plating boards and a uniform pressure of 1.0 MPa was applied, then measuring the electrical resistance and multiplying the measured value by the area.

<Measurement of Through-Plane Gas Permeation Resistance>

Using a circular sample with a diameter of 4.7 cm cut out from the gas diffusion electrode substrate, the pressure difference between the surface of the microporous side and the opposite surface thereof when an air was permeated from the surface of the microporous side to the opposite surface thereof at a flow rate of 58 cc/min/cm$^2$ was measured by a differential pressure meter, and the measured value was defined as the through-plane gas permeation resistance.

<Measurement of Melting Point of Fluororesin>

The melting point of the fluororesin was measured by differential scanning calorimetric analysis. Using DSC6220 manufactured by Seiko Instruments Inc. (SII) as the apparatus, the temperature was changed from 30° C. to 400° C. at a heating rate of 2° C./min in nitrogen. The endothermic and exothermic peaks at that time were observed, and the endothermic peak at a temperature of 150° C. or more was defined as the melting point of the fluororesin.

<Measurement of Surface Roughness>

The surface roughness of the electrode substrate was measured using a laser microscope. The measurement was performed by scanning a 5 mm square range with an objective lens with a magnification of 10, using VK-X100 (manufactured by KEYENCE CORPORATION) as a measuring apparatus, and plane tilt correction was performed, then the arithmetic average roughness (Ra) in the 5 mm square was obtained. The measurement was performed for randomly selected 10 points, and the average of arithmetic average roughness at each point was defined as the surface roughness [μm].

<Confirmation Whether or not Carbon Based Filler is Adhered>

A photograph of the carbon fiber on the surface of the opposite side of the surface on which the microporous layer of the gas diffusion electrode substrate was formed was taken at an observation magnification of 2000 times. Using S-4800 manufactured by Hitachi, Ltd. as the scanning electron microscope, photographs of the images of the carbon fiber on the surface were randomly taken for 10 different points from the gas diffusion electrode substrate. Then, whether or not the carbon based filler was present on the carbon fiber of each resulting image was visually confirmed, and when the carbon based filler could be confirmed in one or more photographs, it was determined as that the carbon based filler was adhered to the carbon fiber surface.

<Confirmation of Presence of Fluororesin>

A measurement on the carbon fiber surface that was observed from the opposite side of the surface on which the microporous layer of the gas diffusion electrode substrate was formed and the carbon based filler surface was performed in the conditions of an acceleration voltage of 10 kV and a magnification of 400 times or more, using a scanning electron microscopy (SEM)-EDX measurement, and in the spectrum data obtained in the measurement, whether or not the peak was observed at 0.68 to 0.69 keV was confirmed. As the scanning electron microscope, S-4800 manufactured by Hitachi, Ltd., and as the energy dispersive X-ray analyzer, EX-220SE manufactured by HORIBA, Ltd. were used. In the case where the peak was observed at 0.68 to 0.69 keV, it was defined that fluororesin was present.

Example 1

A gas diffusion electrode substrate having a microporous layer of the composition shown in Table 1 was obtained, according to the methods described in <Preparation of Electrode Substrate> and <Formation of Microporous Layer>. As a result of evaluating fuel cell performance of this gas diffusion electrode substrate, as described in Table 1, the anti-plugging characteristic was good, and the anti-flooding characteristic was also good, having an output voltage of 0.39 V (operation temperature of 65° C., humidification temperature of 80° C., and current density of 2.2 A/cm$^2$). Also, the sliding angle and the electrical resistance were good, and the through-plane gas permeation resistance was very good. When the gas diffusion electrode substrate obtained in Example 1 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 2

A gas diffusion electrode substrate having a microporous layer of the composition shown in Table 1 was obtained, according to the methods described in <Preparation of Electrode Substrate> and <Formation of Microporous Layer>, except for changing the carbon coating solution to one having the composition shown in Table 1 in <Formation of Microporous Layer>. As a result of evaluating fuel cell performance of this gas diffusion electrode substrate, as described in Table 1, the anti-plugging characteristic was better, and the anti-flooding characteristic was also better, having an output voltage of 0.40 V (operation temperature of 65° C., humidification temperature of 80° C., and current density of 2.2 A/cm$^2$). Also, the sliding angle and the electrical resistance were better, and the through-plane gas permeation resistance was very good. When the gas diffusion electrode substrate obtained in Example 2 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 3

A gas diffusion electrode substrate having a microporous layer of the composition shown in Table 1 was obtained, according to the methods described in <Preparation of Electrode Substrate> and <Formation of Microporous Layer>, except that hydrophobic treatment of the electrode substrate was not performed, namely, PTFE was not imparted to the baked carbon fiber. As a result of evaluating fuel cell performance of this gas diffusion electrode substrate, as described in Table 1, the anti-plugging characteristic was very good, and the anti-flooding characteristic was also very good, having an output voltage of 0.43 V (operation temperature of 65° C., humidification temperature of 80° C., and current density of 2.2 A/cm$^2$). Also, the sliding angle, the electrical resistance and the through-plane gas permeation resistance were very good. When the gas diffusion electrode substrate obtained in Example 3 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 4

A gas diffusion electrode substrate having a microporous layer of the composition shown in Table 1 was obtained, according to the methods described in <Preparation of Electrode Substrate> and <Formation of Microporous Layer>, except for changing the carbon coating solution to one having the composition shown in Table 1 in <Formation of Microporous Layer>. As a result of evaluating fuel cell performance of this gas diffusion electrode substrate, as described in Table 1, the anti-plugging characteristic was better, and the anti-flooding characteristic was also better, having an output voltage of 0.40 V (operation temperature of 65° C., humidification temperature of 80° C., and current density of 2.2 A/cm$^2$). Also, the sliding angle was better, and the through-plane gas permeation resistance and the electrical resistance were very good. When the gas diffusion electrode substrate obtained in Example 4 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 5

A gas diffusion electrode substrate having a microporous layer of the composition shown in Table 1 was obtained, according to the methods described in <Preparation of Electrode Substrate> and <Formation of Microporous Layer>, except for changing the retention time in the horizontal state after coating the carbon coating solution to 30 seconds in <Formation of Microporous Layer>. As a result of evaluating fuel cell performance of this gas diffusion electrode substrate, as described in Table 1, the anti-plugging characteristic was good, and the anti-flooding characteristic was also better, having an output voltage of 0.40 V (operation temperature of 65° C., humidification temperature of 80° C., and current density of 2.2 A/cm$^2$). Also, the sliding angle was good, and the electrical resistance and the through-plane gas permeation resistance were very good. When the gas diffusion electrode substrate obtained in Example 5 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 6

A gas diffusion electrode substrate having a microporous layer of the composition shown in Table 1 was obtained, according to the methods described in <Preparation of Electrode Substrate> and <Formation of Microporous Layer>, except that hydrophobic treatment of the electrode substrate was not performed, namely, PTFE was not imparted to the baked carbon fiber. As a result of evaluating fuel cell performance of this gas diffusion electrode substrate, as described in Table 1, the anti-plugging characteristic was very good, and the anti-flooding characteristic was also very good, having an output voltage of 0.42 V (operation temperature of 65° C., humidification temperature of 80° C., and current density of 2.2 A/cm$^2$). Also, the through-plane gas permeation resistance was better, and the sliding angle and the electrical resistance were very good. When the gas diffusion electrode substrate obtained in Example 6 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 7

A gas diffusion electrode substrate having a microporous layer of the composition shown in Table 2 was obtained, according to the methods described in <Preparation of Electrode Substrate> and <Formation of Microporous Layer>, except that the carbon fiber areal weight of the papermaking substrate was set at 23.3 g/m$^2$, the thickness of the prepreg was adjusted so as to be 195 μm, and changing so as to have a thickness of the electrode substrate of 150 μm and an areal weight of 34.2 g/m$^2$, without performing a hydrophobic treatment of the electrode substrate, namely, without imparting PTFE to the baked carbon fiber in <Preparation of Electrode Substrate>, and changing the retention time in the horizontal state after coating the carbon coating solution to 120 seconds in <Formation of Microporous Layer>. As a result of evaluating fuel cell performance of this gas diffusion electrode substrate, as described in Table 2, the anti-plugging characteristic was very good, and the anti-flooding characteristic was also very good, having an output voltage of 0.41 V (operation temperature of 65° C., humidification temperature of 80° C., and current density of 2.2 A/cm$^2$). Also, the sliding angle and the electrical resistance were very good, and the through-plane gas permeation resistance was good. When the gas diffusion electrode substrate obtained in Example 7 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 8

A gas diffusion electrode substrate having a microporous layer of the composition shown in Table 2 was obtained, according to the methods described in <Preparation of Electrode Substrate> and <Formation of Microporous Layer>, except that hydrophobic treatment of the electrode substrate was not performed, namely, PTFE was not imparted to the baked carbon fiber, and except for changing the retention time in the horizontal state after coating the carbon coating solution to 120 seconds in <Formation of Microporous Layer>. As a result of evaluating fuel cell performance of this gas diffusion electrode substrate, as described in Table 2, the anti-plugging characteristic was very good, and the anti-flooding characteristic was also very good, having an output voltage of 0.42 V (operation temperature of 65° C., humidification temperature of 80° C., and current density of 2.2 A/cm$^2$). Also, the sliding angle and the through-plane gas permeation resistance were very good, and the electrical resistance was better. When the gas diffusion electrode substrate obtained in Example 8 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 9

A gas diffusion electrode substrate having a microporous layer of the composition shown in Table 2 was obtained, according to the methods described in <Preparation of Electrode Substrate> and <Formation of Microporous Layer>, except that hydrophobic treatment of the electrode substrate was not performed, namely, PTFE was not imparted to the baked carbon fiber, and except for changing the retention time in the horizontal state after coating the carbon coating solution to 180 seconds in <Formation of Microporous Layer>. As a result of evaluating fuel cell performance of this gas diffusion electrode substrate, as described in Table 2, the anti-plugging characteristic was very good, and the anti-flooding characteristic was also very good, having an output voltage of 0.41 V (operation temperature of 65° C., humidification temperature of 80° C., and current density of 2.2 A/cm$^2$). Also, the sliding angle and the through-plane gas permeation resistance were very good, and the electrical resistance was good. When the gas diffusion electrode substrate obtained in Example 9 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 10

A gas diffusion electrode substrate having a microporous layer of the composition shown in Table 3 was obtained, according to the methods described in <Preparation of Electrode Substrate> and <Formation of Microporous Layer>, except for changing the carbon coating solution to one having the composition shown in Table 3 in <Formation of Microporous Layer>. As a result of evaluating fuel cell performance of this gas diffusion electrode substrate, as described in Table 3, the anti-plugging characteristic was better, and the anti-flooding characteristic was also better, having an output voltage of 0.40 V (operation temperature of 65° C., humidification temperature of 80° C., and current density of 2.2 A/cm$^2$). Also, the sliding angle was better, and the through-plane gas permeation resistance and the electrical resistance were very good. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Example 11

A gas diffusion electrode substrate having a microporous layer of the composition shown in Table 3 was obtained, according to the methods described in <Preparation of Electrode Substrate> and <Formation of Microporous Layer>, except for changing the carbon coating solution to one having the composition shown in Table 3 in <Formation of Microporous Layer>. As a result of evaluating fuel cell performance of this gas diffusion electrode substrate, as described in Table 3, the anti-plugging characteristic was good, and the anti-flooding characteristic was also good, having an output voltage of 0.39 V (operation temperature of 65° C., humidification temperature of 80° C., and current density of 2.2 A/cm$^2$). Also, the sliding angle was better, and the through-plane gas permeation resistance and the electrical resistance were very good. Moreover, precipitation was likely to occur in the carbon coating solution used in Example 11 more than in the carbon coating solution used in Example 10. When the gas diffusion electrode substrate obtained in Example 11 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Examples 12 and 13

A gas diffusion electrode substrate having a microporous layer of the composition shown in Table 3 was obtained, according to the methods described in <Preparation of Electrode Substrate> and <Formation of Microporous Layer>, except for controlling the loading amount of the resin component on both sides of the electrode substrate to change so that, as compared to the surface roughness of the side where the microporous layer of the electrode substrate is formed, the surface roughness of the opposite side thereof becomes large in <Impregnation of Resin Composition>. As a result of evaluating fuel cell performance of this gas diffusion electrode substrate, as described in Table 3, the anti-plugging and anti-flooding characteristics were improved, as compared to the comparative examples. Also, the sliding angle, the electrical resistance and the through-plane gas permeation resistance were improved. Particularly in Example 13, as compared to the surface roughness of the side where the microporous layer of the electrode substrate is formed, the surface roughness of the opposite side thereof was optimal, thus the fuel cell performance was extremely greatly improved. When the gas diffusion electrode substrates obtained in Examples 12 and 13 were subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

TABLE 1

| | | | Example 1 | Example 2 | Example 3 | Example 4 | Example 5 | Example 6 |
|---|---|---|---|---|---|---|---|---|
| Microporous layer | Composition of carbon coating solution | Vapor phase growth carbon fiber (aspect ratio: 50) | — | 2.3 | 4.6 | 4.6 | 4.6 | 1.4 |
| | | Acetylene black | 7.7 | 5.4 | 3.1 | 3.1 | 3.1 | 6.3 |
| | | PTFE | 4 | 4 | — | 4 | 4 | — |
| | | FEP | — | — | 5 | — | — | 5 |

TABLE 1-continued

|  |  | Example 1 | Example 2 | Example 3 | Example 4 | Example 5 | Example 6 |
|---|---|---|---|---|---|---|---|
|  | Surfactant | 14 | 14 | 14 | 14 | 14 | 14 |
|  | Ethylene glycol | — | — | — | — | — | — |
|  | Purified water | 74.3 | 74.3 | 73.3 | 74.3 | 74.3 | 73.3 |
|  | Areal weight [g/m$^2$] | 14 | 20 | 20 | 20 | 20 | 20 |
|  | Horizontal retention time [sec] | 60 | 60 | 60 | 60 | 30 | 60 |
| Electrode substrate | Thickness [μm] | 100 | 100 | 100 | 100 | 100 | 100 |
|  | Areal weight [g/m$^2$] | 24.0 | 24.0 | 24.0 | 24.0 | 24.0 | 24.0 |
|  | Covering rate of carbon based filler on carbon fiber surface [%] | 7 | 7 | 9 | 7 | 5 | 9 |
|  | Presence or absence of pore with diameter of 10 μm or more | Present | Present | Present | Present | Present | Present |
|  | Water repellent agent (fluororesin) | PTFE | PTFE | — | PTFE | PTFE | — |
|  | Water repellent agent (fluororesin) addition amount [%] | 5 | 5 | — | 5 | 5 | — |
|  | Drying temperature [° C.] in hydrophobic treatment step | 100 | 100 | — | 100 | 100 | — |
|  | Impregnation areal weight of carbon coating solution [g/m$^2$] | — | — | — | — | — | — |
|  | Second microporous layer areal weight [g/m$^2$] | — | — | — | — | — | — |
| Physical properties of gas diffusion electrode substrate | Sliding angle [degree] | 27 | 24 | 12 | 23 | 27 | 15 |
|  | Through-plane gas permeation resistance [mmAq] | 150 | 70 | 40 | 50 | 40 | 175 |
|  | Electrical resistance [mΩ · cm$^2$] | 7.2 | 6.6 | 6.2 | 6.4 | 6.4 | 6.4 |
| Fuel cell performance | Anti-plugging characteristic | B | A | S | A | B | S |
|  | Anti-flooding characteristic: output voltage [V] | 0.39 | 0.40 | 0.43 | 0.40 | 0.40 | 0.42 |

TABLE 2

|  |  |  | Example 7 | Example 8 | Example 9 |
|---|---|---|---|---|---|
| Microporous layer | Composition of carbon coating solution | Vapor phase growth carbon fiber (aspect ratio: 50) | 0.7 | 2.3 | 2.3 |
|  |  | Acetylene black | 7.0 | 5.4 | 5.4 |
|  |  | PTFE | — | — | — |
|  |  | FEP | 5 | 5 | 5 |
|  |  | Surfactant | 14 | 14 | 14 |
|  |  | Ethylene glycol | — | — | — |
|  |  | Purified water | 73.3 | 73.3 | 73.3 |
|  | Areal weight [g/m$^2$] |  | 20 | 20 | 20 |
|  | Horizontal retention time [sec] |  | 120 | 120 | 180 |
| Electrode substrate | Thickness [μm] |  | 150 | 100 | 100 |
|  | Areal weight [g/m$^2$] |  | 34.2 | 24.0 | 24.0 |
|  | Covering rate of carbon based filler on carbon fiber surface [%] |  | 9 | 34 | 56 |
|  | Presence or absence of pore with diameter of 10 μm or more |  | Present | Present | Present |
|  | Water repellent agent (fluororesin) |  | — | — | — |
|  | Water repellent agent (fluororesin) addition amount [%] |  | — | — | — |
|  | Drying temperature [° C.] in hydrophobic treatment step |  | — | — | — |
| Impregnation areal weight of carbon coating solution [g/m$^2$] |  |  | — | — | — |
| Second microporous layer areal weight [g/m$^2$] |  |  | — | — | — |
| Physical properties of gas diffusion electrode substrate | Sliding angle [degree] |  | 15 | 10 | 9 |
|  | Through-plane gas permeation resistance [mmAq] |  | 185 | 45 | 50 |
|  | Electrical resistance [mΩ · cm$^2$] |  | 6.4 | 6.7 | 7.2 |
| Fuel cell performance | Anti-plugging characteristic |  | S | S | S |
|  | Anti-flooding characteristic: output voltage [V] |  | 0.41 | 0.42 | 0.41 |

TABLE 3

|  |  |  | Example 10 | Example 11 | Example 12 | Example 13 |
|---|---|---|---|---|---|---|
| Microporous layer | Composition of carbon coating solution | Vapor phase growth carbon fiber (aspect ratio: 50) | — | — | 4.6 | 4.6 |
|  |  | Vapor phase growth carbon fiber (aspect ratio: 110) | 4.6 | — | — | — |
|  |  | Multi-walled carbon nanotube (aspect ratio: 1300) | — | 4.6 | — | — |
|  |  | Acetylene black | 3.1 | 3.1 | 3.1 | 3.1 |
|  |  | PTFE | 4 | 4 | — | — |
|  |  | FEP | — | — | 5 | 5 |
|  |  | Surfactant | 14 | 14 | 14 | 14 |
|  |  | Ethylene glycol | — | — | — | — |
|  |  | Purified water | 74.3 | 74.3 | 73.3 | 73.3 |
|  | Areal weight [g/m$^2$] |  | 20 | 20 | 20 | 20 |
|  | Horizontal retention time [sec] |  | 60 | 60 | 60 | 60 |

TABLE 3-continued

|  |  | Example 10 | Example 11 | Example 12 | Example 13 |
|---|---|---|---|---|---|
| Electrode substrate | Thickness [μm] | 100 | 100 | 100 | 100 |
|  | Areal weight [g/m²] | 24.0 | 24.0 | 24.0 | 24.0 |
|  | Covering rate of carbon based filler on carbon fiber surface [%] | 7 | 5 | 36 | 12 |
| Surface roughness of electrode substrate [μm] | Microporous layer side | 16.1 | 16.1 | 14.0 | 14.4 |
|  | Opposite side of microporous layer side | 16.8 | 16.8 | 19.1 | 18.3 |
|  | Difference of surface roughness | 0.7 | 0.7 | 5.1 | 3.9 |
|  | Presence or absence of pore with diameter of 10 μm or more | Present | Present | Present | Present |
|  | Water repellent agent (fluororesin) | PTFE | PTFE | — | — |
|  | Water repellent agent (fluororesin) addition amount [%] | 5 | 5 | — | — |
|  | Drying temperature [° C.] in hydrophobic treatment step | 100 | 100 | — | — |
|  | Impregnation areal weight of carbon coating solution [g/m²] | — | — | — | — |
|  | Second microporous layer areal weight [g/m²] | — | — | — | — |
| Physical properties of gas diffusion electrode substrate | Sliding angle [degree] | 24 | 27 | 15 | 7 |
|  | Through-plane gas permeation resistance [mmAq] | 55 | 40 | 50 | 35 |
|  | Electrical resistance [mΩ · cm²] | 6.4 | 6.4 | 6.8 | 6.0 |
| Fuel cell performance | Anti-plugging characteristic | A | B | B | S |
|  | Anti-flooding characteristic: output voltage [V] | 0.40 | 0.39 | 0.39 | 0.45 |

Comparative Example 1

A gas diffusion electrode substrate having a microporous layer of the composition shown in Table 4 was obtained, according to the methods described in <Preparation of Electrode Substrate> and <Formation of Microporous Layer>, except for changing the retention time in the horizontal state after coating the carbon coating solution to 5 seconds in <Formation of Microporous Layer>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, the anti-plugging characteristic was deteriorated, and the anti-flooding characteristic was also deteriorated, having an output voltage of 0.34 V (operation temperature of 65° C., humidification temperature of 80° C., and current density of 2.2 A/cm²). Also, while the through-plane gas permeation resistance was very good, the electrical resistance was poorer, and the sliding angle was very poor. When the gas diffusion electrode substrate obtained in Comparative Example 1 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 2

A gas diffusion electrode substrate having a microporous layer of the composition shown in Table 4 was obtained, according to the methods described in <Preparation of Electrode Substrate> and <Formation of Microporous Layer>, except for changing the imparted amount of the fluororesin (PTFE) to 20 parts by mass in <Preparation of Electrode Substrate>, and changing the retention time in the horizontal state after coating the carbon coating solution to 5 seconds in <Formation of Microporous Layer>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, the anti-plugging characteristic was deteriorated, and the anti-flooding characteristic was also deteriorated, having an output voltage of 0.33 V (operation temperature of 65° C., humidification temperature of 80° C., and current density of 2.2 A/cm²). Since the fluororesin was filled in the pores of the electrode substrate, the through-plane gas permeation resistance was also poorer. The sliding angle was also poorer, and electrical resistance was very poor. When the gas diffusion electrode substrate obtained in Comparative Example 2 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 3

A gas diffusion electrode substrate having a microporous layer of the composition shown in Table 4 was obtained, according to the methods described in <Preparation of Electrode Substrate> and <Formation of Microporous Layer>, except for changing the fluororesin to FEP in <Preparation of Electrode Substrate>, and changing the retention time in the horizontal state after coating the carbon coating solution to 5 seconds in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, while anti-plugging characteristic was better, the anti-flooding characteristic was deteriorated, having an output voltage of 0.35 V (operation temperature of 65° C., humidification temperature of 80° C., and current density of 2.2 A/cm²). While the through-plane gas permeation resistance was very good, the sliding angle was poor, and the electrical resistance was very poor. When the gas diffusion electrode substrate obtained in Comparative Example 3 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 4

A gas diffusion electrode substrate having a microporous layer of the composition shown in Table 4 was obtained, according to the methods described in <Preparation of Electrode Substrate> and <Formation of Microporous Layer>, except for changing the fluororesin to FEP, and changing the imparted amount of the fluororesin (FEP) to 2 parts by mass in <Preparation of Electrode Substrate>, and changing the retention time in the horizontal state after coating the carbon coating solution to 5 seconds in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, the anti-plugging characteristic was deteriorated, and the anti-flooding characteristic was deteriorated, having an output voltage of 0.22 V (operation temperature of 65° C., humidification temperature of 80° C., and current density of 2.2 A/cm$^2$). While the through-plane gas permeation resistance was very good, the sliding angle was poorer, and the electrical resistance was poor. When the gas diffusion electrode substrate obtained in Comparative Example 4 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 5

A gas diffusion electrode substrate having a microporous layer of the composition shown in Table 4 was obtained, according to the methods described in <Preparation of Electrode Substrate> and <Formation of Microporous Layer>, except for changing the baked carbon fiber to TGP-H-030 manufactured by Toray Industries, Inc., and changing the fluororesin to FEP in <Preparation of Electrode Substrate>, and changing the retention time in the horizontal state after coating the carbon coating solution to 5 seconds in <Preparation of Electrode Substrate>, and changing the dispersion medium to ethylene glycol and not using the surfactant in <Formation of Microporous Layer>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, while the anti-plugging characteristic was good, the anti-flooding characteristic was deteriorated, having an output voltage of 0.25 V (operation temperature of 65° C., humidification temperature of 80° C., and current density of 2.2 A/cm$^2$). While the electrical resistance was very good, the sliding angle and the through-plane gas permeation resistance were very poor. When the gas diffusion electrode substrate obtained in Comparative Example 5 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 6

A gas diffusion electrode substrate having a microporous layer of the composition shown in Table 4 was obtained, according to the methods described in <Preparation of Electrode Substrate> and <Formation of Microporous Layer>, except for changing the drying temperature of the fluororesin to 380° C., and enhancing hydrophobicity of the electrode substrate before coating the carbon coating solution in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 4, the anti-plugging characteristic was deteriorated, and the anti-flooding characteristic was also deteriorated, having an output voltage of 0.35 V (operation temperature of 65° C., humidification temperature of 80° C., and current density of 2.2 A/cm$^2$). While the through-plane gas permeation resistance was very good, the sliding angle was very poor, and the electrical resistance was poorer. When the gas diffusion electrode substrate obtained in Comparative Example 6 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

Comparative Example 7

A gas diffusion electrode substrate having a microporous layer of the composition shown in Table 5 was obtained, according to the methods described in <Preparation of Electrode Substrate> and <Formation of Microporous Layer>, except that the carbon fiber areal weight of the papermaking substrate was set at 38.8 g/m$^2$, the thickness of the prepreg was adjusted so as to be 260 μm, and changing so as to have a thickness of the electrode substrate of 200 μm and an areal weight of 63.2 g/m$^2$, without performing a hydrophobic treatment of the electrode substrate, namely, without imparting PTFE to the baked carbon fiber in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 5, the anti-plugging characteristic was deteriorated, and the anti-flooding characteristic was also deteriorated, having an output voltage of 0.32 V (operation temperature of 65° C., humidification temperature of 80° C., and current density of 2.2 A/cm$^2$). The sliding angle and the through-plane gas permeation resistance were very poor, and electrical resistance was good. When the gas diffusion electrode substrate obtained in Comparative Example 7 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was not present on the carbon fiber surface and the carbon based filler surface.

Comparative Example 8

A gas diffusion electrode substrate having a microporous layer of the composition shown in Table 5 was obtained, according to the methods described in <Preparation of Electrode Substrate> and <Formation of Microporous Layer>, except that the carbon fiber areal weight of the papermaking substrate was set at 38.8 g/m$^2$, the thickness of the prepreg was adjusted so as to be 260 μm, and changing so as to have a thickness of the electrode substrate of 200 μm and an areal weight of 63.2 g/m$^2$, without performing a hydrophobic treatment of the electrode substrate, namely, without imparting PTFE to the baked carbon fiber in <Preparation of Electrode Substrate>, and changing the retention time in the horizontal state after coating the carbon coating solution to 5 seconds in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 5, the anti-plugging characteristic was deteriorated, and the anti-flooding characteristic was also deteriorated, having an output voltage of 0.32 V (operation temperature of 65° C., humidification temperature of 80° C., and current density of 2.2 A/cm$^2$). The sliding angle and the through-plane gas permeation resistance were very poor, and electrical resistance was good. When the gas diffusion electrode substrate obtained in Comparative Example 8 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was not present on the carbon fiber surface and the carbon based filler surface.

Comparative Example 9

A gas diffusion electrode substrate having a microporous layer of the composition shown in Table 5 was obtained, according to the methods described in <Preparation of Electrode Substrate> and <Formation of Microporous Layer>, except that hydrophobic treatment of the electrode substrate was not performed, namely, PTFE was not imparted to the baked carbon fiber, and except for changing the retention time in the horizontal state after coating the carbon coating solution to 350 seconds in <Formation of Microporous Layer>. As a result of evaluating fuel cell performance of this gas diffusion electrode substrate, as described in Table 5, while the anti-plugging characteristic was better, the anti-flooding characteristic was very poor, having an output voltage of 0.25 V (operation temperature of 65° C., humidification temperature of 80° C., and current density of 2.2 A/cm$^2$). Also, while the sliding angle was very good, the through-plane gas permeation resistance was very poor, and the electrical resistance was good. When the gas diffusion electrode substrate obtained in Comparative Example 9 was subjected to differential scanning calorimetry analysis, the endothermic peak was confirmed at 260° C. Namely, it was confirmed that the gas diffusion electrode substrate contains a fluororesin having a melting point of 260° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Comparative Example 10

A gas diffusion electrode substrate having a microporous layer of the composition shown in Table 5 was obtained, according to the methods described in <Preparation of Electrode Substrate> and <Formation of Microporous Layer>, except for impregnating a carbon coating solution diluted with water in the electrode substrate obtained in <Preparation of Electrode Substrate>, so as to have an areal weight of 15 g/m$^2$ after sintering, and heating at 100° C. for 5 minutes, and except for changing the retention time in the horizontal state after coating the carbon coating solution to 5 seconds in <Formation of Microporous Layer>. The covering rate on the carbon fiber surface by the carbon based filler adhered to the carbon fiber of the gas diffusion electrode substrate was 100%, and a pore with a diameter of 10 μm or more was not confirmed on the electrode substrate surface on the opposite side of the surface on which the microporous layer of the gas diffusion electrode substrate was previously formed. As a result of evaluating fuel cell performance of this gas diffusion electrode substrate, as described in Table 5, while the anti-plugging characteristic was better, the anti-flooding characteristic was deteriorated, having an output voltage of 0.32 V (operation temperature of 65° C., humidification temperature of 80° C., and current density of 2.2 A/cm$^2$). While the sliding angle was better, the through-plane gas permeation resistance and the electrical resistance were very poor. When the gas diffusion electrode substrate obtained in Comparative Example 10 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Comparative Example 11

A gas diffusion electrode substrate having microporous layers in both sides of the composition shown in Table 5 was obtained, according to the methods described in <Preparation of Electrode Substrate> and <Formation of Microporous Layer>, except for, before performing sintering at 380° C., coating a carbon coating solution obtained by mixing at a compounding ratio of vapor grown carbon fiber/PTFE/surfactant/purified water=7.7 parts by mass/2.5 parts by mass/14 parts by mass/75.8 parts by mass, also on the surface on the opposite side of the surface on which a microporous layer was previously formed, and heating at 100° C. for 5 minutes, to form a second microporous layer in <Formation of Microporous Layer>. Here, the retention time in the horizontal state after coating the carbon coating solution was set at 5 seconds. The covering rate on the carbon fiber surface by the carbon based filler adhered to the carbon fiber of the gas diffusion electrode substrate was 100%, and a pore with a diameter of 10 μm or more was not confirmed on the electrode substrate surface (second microporous layer surface) on the opposite side of the surface on which the microporous layer of the gas diffusion electrode substrate was previously formed. As a result of arranging this gas diffusion electrode substrate such that the surface on which the microporous layer was previously formed was in contact with the catalyst layer, and evaluating fuel cell performance of this gas diffusion electrode substrate, as described in Table 5, while the anti-plugging characteristic was very good, the anti-flooding characteristic was deteriorated, having an output voltage of 0.25 V (operation temperature of 65° C., humidification temperature of 80° C., and current density of 2.2 A/cm$^2$). While the sliding angle and the electrical resistance were very good, the through-plane gas permeation resistance was very poor. When the gas diffusion electrode substrate obtained in Comparative Example 11 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was adhered to the carbon fiber surface of the opposite side surface of the surface on which the microporous layer of the gas diffusion electrode substrate was formed and that the fluororesin was present on the carbon fiber surface and the carbon based filler surface.

Comparative Example 12

A gas diffusion electrode substrate having a microporous layer of the composition shown in Table 5 was obtained, according to the methods described in <Preparation of Electrode Substrate> and <Formation of Microporous Layer>, except for changing the baked carbon fiber to TGP-H-030 manufactured by Toray Industries, Inc., and changing the fluororesin to FEP in <Preparation of Electrode Substrate>, and except for changing the retention time in the horizontal state after coating the carbon coating solution to 5 seconds in <Preparation of Electrode Substrate>. The covering rate on the carbon fiber surface by the carbon based filler adhered to the carbon fiber of the gas diffusion electrode substrate was 0%. As a result of evaluating fuel cell performance of this gas diffusion electrode substrate, as described in Table 5, while the anti-plugging characteristic was better, the anti-flooding characteristic was deteriorated, having an output voltage of 0.25 V (operation temperature of 65° C., humidification temperature of 80° C., and current density of 2.2 A/cm$^2$). The sliding angle and the through-plane gas permeation resistance were poor, and the electrical resistance was poorer. When the gas diffusion electrode substrate obtained in Comparative Example 12 was subjected to differential scanning calorimetry analysis, the endothermic peak was confirmed at 327° C. Namely, it was confirmed that the gas diffusion electrode substrate contains a fluororesin having a melting point of 327° C. Also, it was confirmed that the carbon based filler was not adhered to the carbon fiber surface of the opposite side surface of the surface on which the microporous layer of the gas diffusion electrode substrate was formed and that the fluororesin was present on the carbon fiber surface and the carbon based filler surface.

TABLE 4

| | | | Comparative Example 1 | Comparative Example 2 | Comparative Example 3 | Comparative Example 4 | Comparative Example 5 | Comparative Example 6 |
|---|---|---|---|---|---|---|---|---|
| Microporous layer | Composition carbon coating solution | Vapor phase growth carbon fiber (aspect of ratio: 50) | 2.3 | 2.3 | 2.3 | 2.3 | 5.0 | 4.6 |
| | | Acetylene black | 5.4 | 5.4 | 5.4 | 5.4 | — | 3.1 |
| | | PTFE | 4 | 4 | 4 | 4 | 5 | 4 |
| | | FEP | — | — | — | — | — | — |
| | | Surfactant | 14 | 14 | 14 | 14 | — | 14 |
| | | Ethylene glycol | — | — | — | — | 90 | — |
| | | Purified water | 74.3 | 74.3 | 74.3 | 74.3 | — | 74.3 |
| | | Areal weight [g/m$^2$] | 20 | 20 | 20 | 20 | 20 | 20 |
| | | Horizontal retention time [sec] | 5 | 5 | 5 | 5 | 5 | 60 |
| Electrode substrate | | Thickness [μm] | 100 | 100 | 100 | 100 | 110 | 100 |
| | | Areal weight [g/m$^2$] | 24.0 | 24.0 | 24.0 | 24.0 | 46.3 | 24.0 |
| | | Covering rate of carbon based filler on carbon fiber surface [%] | 0 | 0 | 0 | 0 | 0 | 0 |
| | | Presence or absence of pore with diameter of 10 μm or more | Present | Present | Present | Present | Present | Present |
| | | Water repellent agent (fluororesin) | PTFE | PTFE | FEP | FEP | FEP | PTFE |
| | | Water repellent agent (fluororesin) addition amount [%] | 5 | 20 | 5 | 2 | 5 | 5 |
| | | Drying temperature [° C.] in hydrophobic treatment step | 100 | 100 | 100 | 100 | 100 | 380 |
| | | Impregnation areal weight of carbon coating solution [g/m$^2$] | — | — | — | — | — | — |
| | | Second microporous layer areal weight [g/m$^2$] | — | — | — | — | — | — |
| Physical properties of gas diffusion electrode substrate | | Sliding angle [degree] | 80 | 50 | 35 | 50 | 80 | 80 |
| | | Through-plane gas permeation resistance [mmAq] | 70 | 200 | 70 | 70 | 230 | 40 |
| | | Electrical resistance [mΩ · cm$^2$] | 7.6 | 8.5 | 8.5 | 7.7 | 6.4 | 7.6 |

TABLE 4-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Fuel cell performance | Anti-plugging characteristic | C | C | A | C | B | C |
|  | Anti-flooding characteristic: output voltage [V] | 0.34 | 0.33 | 0.35 | 0.22 | 0.25 | 0.35 |

TABLE 5

| | | | Comparative Example 7 | Comparative Example 8 | Comparative Example 9 | Comparative Example 10 | Comparative Example 11 | Comparative Example 12 |
|---|---|---|---|---|---|---|---|---|
| Microporous layer | Composition of carbon coating soution | Vapor phase growth carbon fiber (aspect ratio: 50) | — | — | 2.3 | 2.3 | 2.3 | 2.3 |
| | | Acetylene black | 7.7 | 7.7 | 5.4 | 5.4 | 5.4 | 5.4 |
| | | PTFE | 4 | 4 | — | 4 | 4 | 4 |
| | | FEP | — | — | 5 | — | — | — |
| | | Surfactant | 14 | 14 | 14 | 14 | 14 | 14 |
| | | Ethylene glycol | — | — | — | — | — | — |
| | | Purified water | 74.3 | 74.3 | 73.3 | 74.3 | 74.3 | 74.3 |
| | | Areal weight [g/m$^2$] | 20 | 20 | 20 | 20 | 20 | 20 |
| | | Horizontal retention time [sec] | 60 | 5 | 350 | 5 | 5 | 5 |
| Electrode substrate | | Thickness [μm] | 200 | 200 | 100 | 100 | 100 | 110 |
| | | Areal weight [g/m$^2$] | 63.2 | 63.2 | 24.0 | 24.0 | 24.0 | 46.3 |
| | | Covering rate of carbon based filler on carbon fiber surface [%] | 0 | 0 | 80 | 100 | 100 | 0 |
| | | Presence or absence of pore with diameter of 10 μm or more | Present | Present | Present | Absent | Absent | Present |
| | | Water repellent agent (fluororesin) | — | — | — | PTFE | PTFE | FEP |
| | | Water repellent agent (fluororesin) addition amount [%] | — | — | — | 5 | 5 | 5 |
| | | Drying temperature [° C.] in hydrophobic treatment step | — | — | — | 100 | 100 | 100 |
| | Impregnation areal weight of carbon coating solution [g/m$^2$] | | — | — | — | 15 | — | — |
| | Second microporous layer areal weight [g/m$^2$] | | — | — | — | — | 10 | — |
| Physical properties of gas diffusion electrode substrate | | Sliding angle [degree] | 80 | 80 | 10 | 24 | 10 | 35 |
| | | Through-plane gas permeation resistance [mmAq] | 240 | 230 | 240 | 230 | 220 | 200 |
| | | Electrical resistance [mΩ·cm$^2$] | 7.2 | 7.2 | 7.6 | 8.4 | 6.4 | 7.8 |
| Fuel cell performance | | Anti-plugging characteristic | C | C | A | A | S | A |
| | | Anti-flooding characteristic: output voltage [V] | 0.32 | 0.32 | 0.25 | 0.32 | 0.25 | 0.25 |

The invention claimed is:

1. A gas diffusion electrode substrate for a fuel cell, which comprises a microporous layer formed on a first surface of an electrode substrate, wherein the microporous layer comprises a carbon based filler and a fluororesin, and wherein
a water sliding angle on a second surface of the electrode substrate, which is opposite to the first surface on which the microporous layer is formed, is 30 degrees or less, and
the through-plane gas permeation resistance of the gas diffusion electrode substrate is 15 to 190 mmAq at a flow rate of 58 cc/min/cm$^2$.

2. The gas diffusion electrode substrate according to claim 1, wherein the electrical resistance in the through-plane direction in a state where the gas diffusion electrode substrate is pressurized at 1 MPa is 7.4 mΩ·cm2 or less.

3. The gas diffusion electrode substrate according to claim 1, wherein the carbon based filler is adhered to a carbon fiber surface that can be observed on the second surface of the electrode substrate, and the gas diffusion electrode substrate has a pore diameter of 10 μm or more on the second surface of the electrode substrate.

4. The gas diffusion electrode substrate according to claim 1, wherein the carbon based filler is adhered to a carbon fiber surface that can be observed on the second surface of the electrode substrate, and the carbon based filler of the gas diffusion electrode substrate is a linear carbon having an aspect ratio of 30 to 5000.

5. The gas diffusion electrode substrate according to claim 1, wherein the electrode substrate comprises carbon fiber, and 1 to 70% of the second surface of the electrode substrate surface is covered with the carbon based filler as observable from the second surface of the electrode substrate.

6. The gas diffusion electrode substrate according to claim 1, wherein the thickness of the electrode substrate is 160 μm or less.

7. The gas diffusion electrode substrate according to claim 1, wherein the surface roughness of the second surface of the electrode substrate is larger by 1.0 μm or more and 5.0 μm or less than the surface roughness of the first side of the electrode substrate where the microporous layer is formed.

8. The gas diffusion electrode substrate according to claim 1, wherein the electrode substrate comprises carbon fiber, and the fluororesin is present on the second surface of the electrode substrate as observable from the second surface of the electrode substrate.

9. The gas diffusion electrode substrate according to claim 1, wherein the fluororesin has a melting point of 200° C. or more and 320° C. or less.

10. The gas diffusion electrode substrate according to claim 1, wherein the fluororesin is tetrafluoroethylene-hexa fluoro propylene copolymer (FEP).

11. The gas diffusion electrode substrate according to claim 1, wherein the carbon based filler contains a vapor grown carbon fiber.

12. A membrane electrode assembly having catalyst layers on both sides of an electrolyte membrane, and having the gas diffusion electrode substrate as defined in claim 1 disposed on at least an outer side of one of the catalyst layers.

13. A fuel cell having bipolar plates on both sides of the membrane electrode assembly as defined in claim 12.

14. A method for producing the gas diffusion electrode substrate as defined in claim 1, comprising:
    coating on one surface of an electrode substrate a carbon coating solution which comprises a carbon based filler, a fluororesin and a dispersion medium at a thickness of 160 μm or less so as to produce a coated electrode substrate, wherein the fluororesin is not coated before coating the carbon coating solution,
    then holding the coated electrode substrate, for a period of 10 seconds or more and less than 5 minutes, so as to allow for infiltration of the carbon coating solution into the coated electrode substrate, and
    subsequently drying and sintering the coated electrode substrate,
    wherein the fluororesin is not coated before coating the carbon coating solution, or sintering is not performed before coating the carbon coating solution.

15. The method for producing the gas diffusion electrode substrate according to claim 14, wherein the dispersion medium is water.

16. The method for producing the gas diffusion electrode substrate according to claim 14, comprising, in the case that, before coating the carbon coating solution, sintering is not performed after coating the fluororesin, drying it at a temperature of 90° C. or more and less than 200° C., after coating the fluororesin.

* * * * *